(12) United States Patent
Zhang et al.

(10) Patent No.: US 12,069,662 B2
(45) Date of Patent: Aug. 20, 2024

(54) SIGNAL TRANSMISSION METHOD AND DEVICE

(71) Applicant: ZTE CORPORATION, Shenzhen (CN)

(72) Inventors: Shujuan Zhang, Shenzhen (CN); Zhaohua Lu, Shenzhen (CN); Yuhong Gong, Shenzhen (CN); Xiaopeng Wang, Shenzhen (CN); Meng Mei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 239 days.

(21) Appl. No.: 17/541,746

(22) Filed: Dec. 3, 2021

(65) Prior Publication Data
US 2022/0110108 A1 Apr. 7, 2022

Related U.S. Application Data

(63) Continuation of application No. 16/338,429, filed as application No. PCT/CN2017/078208 on Mar. 24, 2017, now Pat. No. 11,224,031.

(30) Foreign Application Priority Data

Sep. 30, 2016 (CN) .......................... 201610878700.X

(51) Int. Cl.
*H04W 72/20* (2023.01)
*H04L 1/00* (2006.01)
(Continued)

(52) U.S. Cl.
CPC ........... *H04W 72/20* (2023.01); *H04L 1/0003* (2013.01); *H04L 1/0013* (2013.01);
(Continued)

(58) Field of Classification Search
CPC ... H04L 5/0046; H04L 69/324; H04L 5/0087; H04L 5/0094; H04L 5/0051;
(Continued)

(56) References Cited

U.S. PATENT DOCUMENTS 11,224,031 B2 * 1/2022 Zhang ................... H04L 69/324
2012/0294163 A1 11/2012 Turtinen
(Continued)

FOREIGN PATENT DOCUMENTS

CN 101242216 A 8/2008
CN 101500259 A 8/2009
(Continued)

OTHER PUBLICATIONS

Alcatel-Lucent, Alcatel-Lucent Shanghai Bell, "Downlink Control Signalling and Transmission Modes for Comp", 3GPP TSG RAN WG1 Meeting #68bis, Jeju, Korea, Mar. 26-30, 2012, R1-121244.
(Continued)

*Primary Examiner* — Maharishi V Khirodhar
*Assistant Examiner* — Kenneth P Hunt
(74) *Attorney, Agent, or Firm* — Perkins Coie LLP

(57) ABSTRACT

The application discloses a signal transmission method and device. The signal transmission method comprises: a first communication node determining a mode for transmitting data in a time unit to a second communication node; and the first communication node transmitting data to the second communication mode in the time unit according to the determined mode for transmitting data. The data includes N data sets, where N is a positive integer. A data transmission method for M data sets in the data is known by the second communication node. Related information of a data transmission method for (N−M) data sets is notified to the second
(Continued)

A SECOND COMMUNICATION NODE RECEIVES DATA ACCORDING TO A KNOWN DATA TRANSMISSION MANNER WITHIN A FIRST TIME LENGTH AFTER A CONTROL CHANNEL, AND RECEIVES THE DATA BY ADOPTING DATA TRANSMISSION MANNER RELATED INFORMATION NOTIFIED BY A CONTROL SIGNALING AFTER THE FIRST TIME LENGTH — S210

THE SECOND COMMUNICATION NODE DETERMINES A NUMBER N OF DATA SETS COMPRISED IN DATA TRANSMITTED BY A FIRST COMMUNICATION NODE TO THE SECOND COMMUNICATION NODE IN A TIME UNIT, AND DETERMINES A DEMODULATION REFERENCE SIGNAL RESOURCE AND A MODE THAT THE SECOND COMMUNICATION NODE RECEIVES DATA ACCORDING TO THE N VALUE — S220 communication node by the first communication node by means of a control signal in the time unit, where M is less than or equal to N.

6 Claims, 11 Drawing Sheets

(51) Int. Cl.
*H04L 5/00* (2006.01)
*H04L 69/324* (2022.01)

(52) U.S. Cl.
CPC .......... *H04L 5/0048* (2013.01); *H04L 5/0055* (2013.01); *H04L 69/324* (2013.01)

(58) Field of Classification Search
CPC ... H04L 1/0003; H04L 5/0055; H04L 5/0048; H04L 1/0013; H04L 5/0007; H04W 72/20
See application file for complete search history.

(56) References Cited

U.S. PATENT DOCUMENTS

| | | |
|---|---|---|
| 2013/0265955 A1 | 10/2013 | Kim |
| 2015/0009968 A1* | 1/2015 | Yu .................. H04L 5/0053 370/336 |
| 2015/0304995 A1 | 10/2015 | Yi |
| 2016/0157229 A1* | 6/2016 | Zhuang ............ H04L 27/2656 370/329 |
| 2016/0173217 A1 | 6/2016 | Sano |
| 2018/0376495 A1 | 12/2018 | Lee |
| 2020/0092063 A1* | 3/2020 | Baldemair ........... H04W 72/23 |

FOREIGN PATENT DOCUMENTS

| | | |
|---|---|---|
| CN | 104105138 A | 10/2014 |
| CN | 104579607 A | 4/2015 |
| CN | 105024781 A | 11/2015 |
| CN | 105975408 A | 9/2016 |
| WO | 2013170911 A1 | 11/2013 |

OTHER PUBLICATIONS

Chinese Office Action for corresponding application 201610878700.X; Report dated Jan. 19, 2022.
Chinese Office Action for corresponding application 201610878700.X; Report dated Jan. 26, 2022.
MediaTek Inc., "Discussion on timing relationship for (E)PDCCH and PDSCH", 3GPP TSG-RAN WG1 #75, San Francisco, USA, Nov. 11-15, 2013, R1-135427.
Motorola Mobility, "Downlink data transmission for coverage enhancement in MTC UE", 3GPP TSG-RAN WG1 meeting #72bis, Chicago, USA, Apr. 15-19, 2013, R1-131518.
European Search Report issued in EP Patent Application No. 23192985.2, dated Feb. 7, 2024, 9 pages.
European Communication under Rule 71(3) EPC issued in EP Patent Application No. 17854381.5, dated Jun. 28, 2023, 8 pages.
Downlink Control Signalling and Transmission Modes for Comp, 3GPP TSG RAN WG1 Meeting #68bis, Jeju, Korea, Mar. 26-30, 2012, R1-121244.
European Search Report for corresponding application EP17854381; Report dated Mar. 1, 2020.
International Search Report for International Application No. PCT/CN2017/078208 mailed May 16, 2017, 2 pages.

* cited by examiner

SIGNAL TRANSMISSION METHOD AND DEVICE

CROSS-REFERENCE TO RELATED APPLICATION

This application is a continuation of U.S. patent applicant Ser. No. 16/338,429, having a filing date of Nov. 1, 2019, which was the U.S. national stage of International Patent Application Number PCT/CN2017/078208 filed on Mar. 24, 2017, which claimed priority to Chinese Patent Application Number 201610878700.X, filed on Sep. 30, 2016, the contents of all of which said applications are herein incorporated by reference in their entirety.

TECHNICAL FIELD

This disclosure relates to, but is not limited to, the field of wireless communication technologies, and in particular, to a signal transmission method and device.

BACKGROUND

High-frequency communication as one of core technologies in the future 5G (5th generation) communication, large-capacity communication may be provided, but a remarkable feature of high-frequency communication is the large spatial fading. At the same time, since the wave length of high-frequency wave is relatively short, a large-scale antenna array element can be integrated in a small area to form a high-gain beam, thereby effectively increasing the coverage of high-frequency communication. Therefore, a remarkable feature of high-frequency communication is based on beam communication.

Based on the high-frequency technology of beam communication, it is necessary to consider the problems of link robustness and system efficiency. At this time, control and data may use different transmit beams, for example, the control considering robustness, and the data considering system performance. In the case of a limited radio frequency link, in order to obtain optimal system efficiency, the user's transmit beam may change instead of always corresponding the optimal transmit beam of the user. In this dynamic transmit beam change scenario, how to receive data is a further problem that is required to be solved.

This section provides background information related to the present disclosure which is not necessarily prior art.

SUMMARY

The following is an overview of the subject matters detailed in this disclosure. This summary is not intended to limit the scope of the claims.

The disclosure provides a signal transmission method and device, which can solve the problem of data reception when a terminal has multiple radio frequency receiving beams in high frequency communication, so that the base station can flexibly schedule resources based on system efficiency.

An embodiment of the disclosure provides a signal transmission method, comprising:
  a first communication node determining a mode for transmitting data in one time unit to a second communication node;
  the first communication node transmitting data to the second communication mode in the time unit according to the determined mode for transmitting data;
  wherein, the data comprises N data set(s), in which N is a positive integer; a data transmission manner for M data set(s) in the data is known by the second communication node, related information of a data transmission manner for N-M data set(s) is notified to the second communication node by the first communication node by means of a control signaling in the time unit, in which M is less than or equal to N.

An embodiment of the disclosure provides a signal transmission method, comprising:
  a second communication node receives data according to a known data transmission manner within a first time length after a control channel, and receives the data by adopting data transmission manner related information notified by a control signaling after the first time length;
  the second communication node determines a number N of data sets comprised in data transmitted by a first communication node to the second communication node in a time unit, and determines a demodulation reference signal resource and a mode that the second communication node receives data according to the N value.

An embodiment of the disclosure provides a signal transmission device applied to a first communication node, comprising:
  a judgment module, configured to determine a mode for transmitting data to a second communication node in one time unit;
  a transmitting module, configured to transmit data to the second communication node in the time unit according to a determined mode for transmitting data;
  wherein the data comprises N data set(s), and N is a positive integer; the data transmission manner of the M data set(s) in the data is known by the second communication node, and the data transmission manner related information of the N-M data set(s) is notified to the second communication node by the first communication node in the time unit with a control signaling, M is less than or equal to N.

An embodiment of the disclosure provides a signal transmission device applied to a second communication node, comprising:
  a receiving module, configured to receive data according to a known data transmission manner within a first time length after a control channel, and to receive data by adopting data transmission manner related information notified by a control signaling after the first time length;
  an analysis module, configured to determine a number N of data sets comprised in data transmitted by the first communication node to the second communication node in one time unit, and to determine a demodulation reference signal resource and a mode that the second communication node receives data according to the N value.

An embodiment of the disclosure provides a method for transmitting a control signaling, comprising:
  a first communication node determining first information and second information;
  wherein the first information comprises transmitting manner information, and/or receiving manner information; and the second information comprises at least one piece of following information: demodulation reference signal information, time domain pre-coding group information, starting location information, modulation and coding strategy MCS set number information, and rate matching information;

the first communication node transmitting a control signaling to a second communication node, the first information and the second information in the control signaling are associated with each other.

An embodiment of the disclosure provides a method for transmitting a control signaling, comprising:

a second communication node receiving the control signaling transmitted by a first communication node, wherein first information and second information in the control signaling are associated; the first information comprises transmitting manner information and/or receiving manner information; and the second information comprises at least one piece of following information: demodulation reference signal information, time domain pre-coding group information, start position information, modulation and coding strategy MCS set number information, rate matching information;

the second communication node determining the first information and the second information according to the control signaling.

An embodiment of the disclosure provides a controlling signaling transmission device, used in the first communication node, comprising:

an information determining module, configured to determine first information and second information; wherein, the first information comprises transmitting manner information, and/or receiving manner information; and the second information comprises at least one piece of following information: demodulation reference signal information, time domain pre-coding group information, starting location information, modulation and coding strategy MCS set number information, and rate matching information;

a signaling transmitting module, configured to transmit a control signaling to a second communication node, the first information and the second information in the control signaling are associated with each other.

An embodiment of the disclosure provides a controlling signaling transmission device, used in the second communication node, comprising:

a signaling receiving module, configured to receive a control signaling transmitted by the first communication node; wherein first information and second information in the control signaling are associated; the first information comprises transmitting manner information and/or receiving manner information; and the second information comprises at least one piece of following information: demodulation reference signal information, time domain pre-coding group information, start position information, modulation and coding strategy MCS set number information, rate matching information;

an information determining module, configured to determine the first information and second information according to the control signaling.

The embodiment of the disclosure further provides a computer readable storage medium which stores computer executable instructions, which are implemented when executed by a processor.

Comparing with related arts, the present disclosure provides a signal transmission method and device. The first communication node (for example, the base station) determines a mode for transmitting data to the second communication node (for example, the terminal) in one time unit, and transmits data to the second communication node in the time unit according to the determined mode for transmitting data; and the data comprises N data set(s), wherein a data transmission manner of the M data set(s) in the data is known by the second communication node, and the data transmission manner related information of N–M data set(s) is notified to the second communication node by the first communication node in the time unit by a control signaling. The second communication node receives data according to a known data transmission manner within a first time length after the control channel, and receives data after the first time length by using data transmission manner related information notified by the control signaling; and the second communication node determines a number N of data sets comprised in the data transmitted by the first communication node to the second communication node in one time unit, and determining demodulation reference signal resource and a mode that the second communication node receives the data according to the N value. The technical solutions of the embodiments of the present disclosure can solve the problem of data reception, the problem of transmitting and receiving the demodulation reference signal, and the related problems of channel coding and modulation between different data units, when the terminal has multiple radio frequency receiving beams in the high frequency communication, so that the base station is able to flexibly schedule resources based on system efficiency.

Other aspects will be apparent upon reading and understanding the drawings and detailed description.

This section provides a summary of various implementations or examples of the technology described in the disclosure, and is not a comprehensive disclosure of the full scope or all features of the disclosed technology.

DETAILED DESCRIPTION

The embodiments of the disclosure will be described in detail below with reference to the accompanying drawings. It should be noted that, in the case of no conflict, the embodiments in the disclosure and the features in the embodiments may be arbitrarily combined with each other.

Embodiment 1

Figure 1:
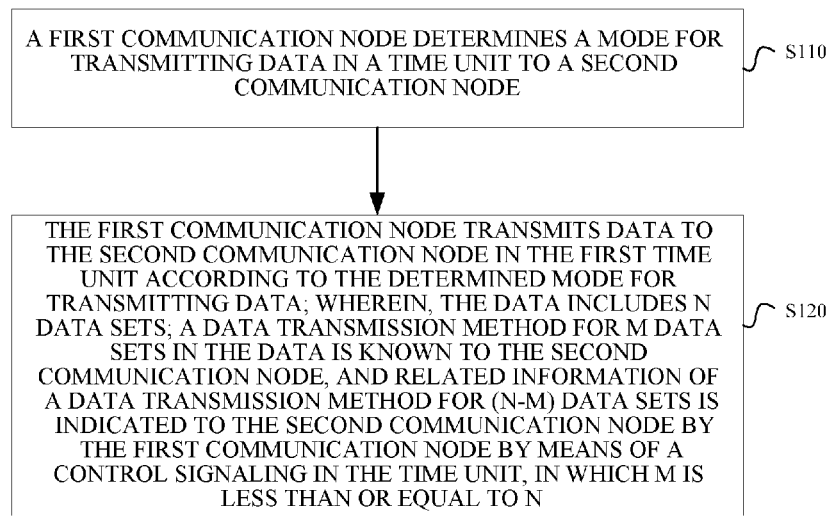
FIG. 1 is a flowchart of a signal transmission method of embodiment 1 of the disclosure (a first communication node)

As shown in FIG. 1, an embodiment of the disclosure provides a signal transmission method, comprising:

S110, a first communication node determining a mode for transmitting data in one time unit to a second communication node;

S120, the first communication node transmitting data to the second communication mode in the time unit according to the determined mode for transmitting data;

wherein, the data comprises N data set(s), in which N is a positive integer; a data transmission manner for M data set(s) in the data is known by the second communication node, related information of a data transmission manner for N-M data set(s) is notified to the second communication node by the first communication node by means of a control signaling in the time unit, in which M is less than or equal to N.

Alternatively, when N is greater than a threshold N1, the mode for transmitting data comprises following features:

M data set(s) and N-M data set(s) being time division multiplexed in the time unit;

there being a time interval between the M data set(s) and the N-M data set(s), or the first p symbol(s) of the N-M data set(s) adopt(s) a first Cyclic Prefix (CP for short), and remaining n-p symbol(s) of the N-M data set(s) adopt(s) a second Cyclic Prefix CP, the length of the first Cyclic Prefix CP is greater than the length of the second Cyclic Prefix CP; the N-M data set(s) comprise n symbols, p is less than or equal to n, both n and p are positive integers.

Alternatively, when N is greater than the threshold N1, the mode for transmitting data comprises following features:

there being intersections between demodulation reference signal resources of the M data set(s) and demodulation reference signal resources of a control signaling;

the N-M data set(s) sharing a set of demodulation reference signal resources, or each of the N-M data set(s) carrying a demodulation reference signal that demodulates itself.

Alternatively, when N is greater than the threshold N1, the mode for transmitting data comprises following features:

each data set being independently channel coded; each data set carrying a Cyclic Redundancy Check CRC; each data set corresponding to one piece of ACK/NACK feedback information.

Alternatively, when N is greater than the threshold N1, the mode for transmitting data comprises following features:

each data set being independently channel coded; each data set carrying a Cyclic Redundancy Check (CRC for short); each data set corresponding to ACK (Acknowledgement)/NACK (Non-acknowledgement) feedback information.

Alternatively, when N is greater than the threshold N1, the mode for transmitting data comprises following features:

notifying configuration information of the N data set(s) simultaneously in one control signaling; or notifying the time-frequency resources occupied by the N data set(s) in a resource scheduling part of one control signaling;

wherein the configuration information of the data sets comprises: a Modulation and Coding Scheme (MCS for short) information of the data sets, and/or time-frequency resources that the data sets occupy in the time unit.

Alternatively, when N is less than or equal to the threshold N1, the mode for transmitting data adopts a first transmitting structure;

the first transmitting structure comprises following features:

there being a guard interval before the data starts; or the length of a third Cyclic Prefix CP adopted by a first a symbol(s) in the data being greater than the length of a fourth Cyclic Prefix CP adopted by remaining t-a symbol(s) in the data;

the data comprising t symbols, and a being less than or equal to t, and both a and t are positive integers.

Alternatively, when N is less than or equal to the threshold N1, the first communication node determines a mode for transmitting data to the second communication node in one time unit, comprising:

determining whether a transmission manner of the data to be transmitted in the time unit and a transmission manner known by the second communication node are the same, if it is different, determining to adopt the first transmitting structure, and if it is the same, determining to adopt the second transmitting structure;

wherein the second transmitting structure comprises at least one of following features:

there being no guard interval before the data starts; a start position of the data is an end position of a control channel; all symbols of the data use a Cyclic Prefix CP of the same length.

Alternatively, the number N of the data sets is determined according to at least one of following basis:
whether a first time interval between a start time of the data and an end time of the control channel is greater than a first time length;
whether a second time interval between an end time of the data and the end time of the control channel is greater than the first time length;
whether the transmission manner of the data to be transmitted in the time unit and the transmission manner known by the second communication node are the same;
the N value being agreed to be less than or equal to the threshold N1.

Alternatively, when the first time interval is greater than the first time length, determining that N is less than or equal to the threshold N1;
when the first time interval is less than the first time length and the second time interval is less than or equal to the first time length, determining that N is less than or equal to the threshold N1;
when the first time interval is less than the first time length and the second time interval is greater than the first time length, determining that N is greater than the threshold N1.

Alternatively, when the first time interval is less than the first time length and the second time interval is greater than the first time length, and the transmission manner of the data is the same as the transmission manner of the control channel, determining that N is less than or equal to threshold N1;
when the first time interval is less than the first time length and the second time interval is greater than the first time length, and the transmission manner of the data and the transmission manner of the control channel are different, determining that N is greater than the threshold N1.

Alternatively, when N is less than or equal to the threshold N1, the mode for transmitting data comprises following features:
the M data set(s) occupying resources within a first time length after the control channel, and the N−M data set(s) occupying resources after the first time length after the control channel;
wherein the control channel is an entire control domain of a control channel in the time unit, or a control channel where the control signaling is located.

Alternatively, the first time length is determined by the first communication node according to the receiving manner of the second communication node or the information fed back by the second communication node, and is notified to the second communication node by the first communication node.

The first time length is pre-agreed by the first communication node and the second communication node.

Alternatively, the data receiving manner known by the second communication node and the receiving manner of the second communication node that receives the control signaling have an agreed relationship;
the data transmitting manner known by the second communication node and the transmitting manner of the first communication node transmitting the control signaling have an agreed relationship.

Alternatively, when N is less than or equal to the threshold N1, the mode for transmitting data comprises one of following features:
the data and the control signaling sharing demodulation reference signal resources;
the data and the control signaling sharing demodulation reference signal resources when there is no guard interval before the data starts;
when all symbols of the data use a Cyclic Prefix CP of the same length, the data and the control signaling sharing demodulation reference signal resources.

Alternatively, when N is less than or equal to the threshold N1, the mode for transmitting data comprises following features:
a control instruction related to transmitting data comprising an indication domain of whether the data reception is delayed, and the indication domain being used to indicate whether the data indicated by the control signaling is delayed and is not transmitted until a time unit after the time unit of the control signaling.

Alternatively, the threshold N1 is 1; the N value is 1 or 2.

Alternatively, the data transmission manner comprises at least one of following: a transmitting manner that the first communication node transmits the data, and a receiving manner that the second communication node receives the data;
the data transmission manner satisfying at least one of following characteristics:
the data transmitting manner known by the second communication node belonging to a collection of data transmitting manners fed back by the second communication node to the first communication node;
the data receiving manner known by the second communication node belonging to a collection of data receiving manners fed back by the second communication node to the first communication node;
the data transmitting manner known by the second communication node being determined according to the transmitting manner that the first communication node transmits a control signaling;
the data receiving manner known by the second communication node being determined according to the receiving manner that the second communication node receives a control signaling;
the data transmitting manner known by the second communication node being determined according to the transmitting manner that the first communication node recently transmitted data to the second communication node;
the data receiving manner known by the second communication node being determined according to the receiving manner that the second communication node recently received data transmitted by the first communication node.

Alternatively, the data transmitting manner known by the second communication node is an optimal transmitting manner of the first communication node that the second communication node feeds back to the first communication node;
the data receiving manner known by the second communication node is a receiving manner of the second communication node corresponding to the optimal transmitting manner of the first communication node that the second communication node feeds back to the first communication node; or the data receiving manner known by the second communication node is an optimal receiving manner of the second communication node that the second communication node feeds back to the first communication node.

Alternatively, the N value and/or the M value are notified to the second communication node by signaling information.

Alternatively, the M value is determined according to the N value; or the M value is determined according to feedback information transmitted by the second communication node; or the M value is a fixed value.

Wherein the transmitting manner comprises at least one of following manners: a transmitting beam, a transmitting port, a transmitting pre-coding matrix, transmitting time, transmitting frequency, a transmitting beam set, quasi-co-location (QCL for short) relationship;

two reference signals satisfy the quasi-co-location relationship in terms of channel characteristic parameter: a channel characteristic parameter of one reference signal may be obtained by a channel characteristic parameter of another reference signal, wherein the channel characteristic parameter comprises at least one of following parameters: delay spread, Doppler spread, Doppler shift, average delay, average gain, average vertical transmission angle, average horizontal transmission angle, average vertical angle of arrival, average horizontal angle of arrival, center vertical transmission angle, center horizontal transmission angle, center vertical angle of arrival, center horizontal angle of arrival;

Wherein the transmitting port may be a transmission antenna port or a transmission reference signal port. Wherein one way is that the transmitting port can only correspond to one transmitting manner at a time, and different transmitting manners can only be generated in a time division manner; another way is that the transmitting port can correspond to one or more transmitting manners at one time.

Wherein the signal transmitting manner is implemented by establishing a QCL relationship between the measurement reference signal and the data demodulation reference signal, where the measurement reference signal comprises a reference signal for channel state measurement, and at least comprises: a Channel State Information Reference Signal (CSI-RS for short) and/or a demodulation reference signal.

Wherein the transmitting time refers to time occupied by a measurement reference signal in a channel measurement phase or a beam measurement phase; the transmitting frequency domain refers to a frequency domain occupied by a measurement reference signal in the channel measurement phase or the beam measurement phase.

Wherein the data receiving manner is a receiving beam, and/or a receiving port, and/or a receiving pre-coding matrix, and/or a receiving time, and/or a receiving frequency, and/or a receiving beam set, which are adopted by the terminal receiving data.

Wherein the receiving port is a receiving antenna port or a used receiving reference signal port, wherein the receiving end is related to the received signal by using a reference signal sequence corresponding to the receiving port.

Wherein a receiving manner is that the receiving end can only correspond to one receiving manner at a time, and different receiving manners can only be generated by time division; the other receiving manner is that the receiving end can correspond to one or more receiving manners at one time. In the embodiment of the disclosure, the receiving manner may also be implemented by a QCL relationship, such as by establishing a quasi-co-location (QCL) relationship between current reference signal (and/or an antenna port) and a reference signal (and/or a basic reference signal, and/or an antenna port) fed back by the second communication node, thereby indicating the receiving beam resources at the receiving end.

For example, indicating the beam resource of the receiving end by establishing a quasi-co-location (QCL) relationship between the current reference signal and the reference signal fed back by the second communication node; and/or indicating the beam resource of the receiving end by establishing a quasi-co-location (QCL) relationship between the current reference signal and the basic reference signal; and/or indicating the beam resource of the receiving end by establishing a quasi-co-location (QCL) relationship between the current reference signal and the antenna port.

Wherein the receiving time refers to time occupied by the measurement reference signal in the channel measurement phase or the beam measurement phase; the transmitting frequency domain refers to the frequency domain occupied by the measurement reference signal in the channel measurement phase or the beam measurement phase.

The symbol is an OFDM (Orthogonal Frequency Division Multiplexing) symbol.

Wherein, one time unit can be one subframe.

The data set may also be referred to as a data block or a data sub-block, and the specific name does not limit the disclosure.

In one embodiment, the data set has at least one of following characteristics, wherein:
a) the one data set corresponds to one time zone;
b) the one data set corresponds to one time domain pre-coding resource group;
c) the one data set corresponds to one relevant area of the data signal;
d) the one data set corresponds to one quasi-co-location area of the data signal; wherein the quasi-co-location area is one time domain resource set, and data signals on different time domain resources in the time domain resource set are quasi-co-located with each other in regard to one or more channel characteristic parameters;
e) channel characteristic parameters correspond to the same demodulation reference signal in different data sets are different;
f) transmitting beams correspond to the same demodulation reference signal in different data sets are different;
g) receiving beams correspond to the same demodulation reference signal in different data sets are different;
h) the MCS level corresponds to each data set may be different;
i) the demodulation reference signals carried in the M data set(s) are different;
j) the demodulation reference signals carried in the N–M data set(s) are different;
k) the time domain of the same demodulation reference signal port is divided into two pre-coding resource groups, wherein the first pre-coding resource group comprises the M data set(s), and the second pre-coding resource group comprises the N–M data set(s);

In an embodiment, each of the data sets carries a demodulation reference signal.

In an embodiment, the N value is determined according to a corresponding number of receiving manners in channel state information that is fed back to the first communication node by the second communication node; and/or the N value is determined according to a corresponding number of transmitting manners in the channel state information that is fed back to the first communication node by the second communication node.

In an embodiment, before determining to transmit the data to the second communication node in one time unit, the first communication node receives radio frequency beam switching time extension information fed back by the second communication node.

In an embodiment, there is an association between first information and second information in the control signaling, where the first information comprises a transmitting manner of the signal, and/or a receiving manner of the signal; the second information comprises at least one of following: demodulation reference signal information, time domain pre-coding group information, start position information, modulation and coding strategy MCS set number information, rate matching information.

Wherein the two types of information are associated with each other: the two types of information are jointly encoded, or one type of the information is notified, and the other type of information is obtained according to the one type of information that has been notified;

Wherein the communication node that transmits data and the communication node that transmits a control signaling may be different communication nodes;

Wherein the resource information of the demodulation reference signal comprises at least one of following: port information of the demodulation reference signal, time domain/frequency domain/code domain resource information occupied by the demodulation reference signal, and correlated area information of the demodulation reference signal, QCL area information of the demodulation reference signal.

In an embodiment, the demodulation reference signal resource information of the data is determined according to a relationship between a transmitting manner of the data notified in the control signaling and a predetermined transmitting manner before the data; and/or the demodulation reference signal resource information of the data is determined according to a relationship between a receiving manner of the data notified in the control signaling and a predetermined receiving manner before the data.

In an embodiment, the guard interval has at least one of following characteristics, wherein:
  a) the guard interval duration information is carried in the control signaling;
  b) the guard interval duration is determined according to radio frequency beam switching time extension information fed back to the first communication node by the second communication node;
  c) the guard interval duration is determined according to receiving manner number information of channel quality that the second communication node feeds back to the first communication node;
  d) the guard interval duration is determined according to transmitting manner number information of the channel quality that the second communication node feeds back to the first communication node;
  e) the guard interval information is used for rate matching of data;
  wherein the rate matching of data is the puncturing processing of data;
  wherein the guard interval is an interval between a start position of the data relative to a start position that the first communication node transmits data to the second communication node, which is agreed by the first communication node and the second communication node;

in an embodiment, rate matching processing of the data is performed according to at least one of following information:
  a) rate matching information comprised in the control signaling;
  b) radio frequency beam switching time extension information fed back to the first communication node by the second communication node;
  c) receiving manner number information of channel quality fed back to the first communication node by the second communication node;
  d) transmitting manner number information of the channel quality fed back to the first communication node by the second communication node;
  e) transmitting manner information of the data notified in the control signaling;
  f) receiving manner information of the data notified in the control signaling;
  g) relationship information between the transmitting manner of the data notified in the control signaling and a predetermined transmitting manner before the data;
  h) relationship information between the receiving manner of the data notified in the control signaling and the predetermined receiving manner before the data.

Embodiment 2

Figure 2:
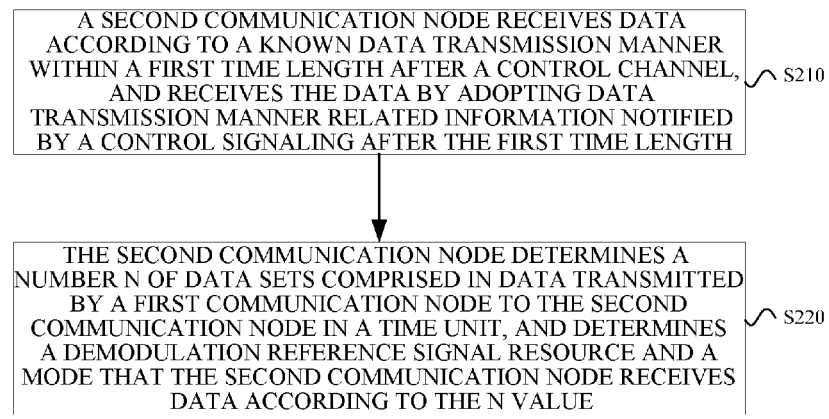
FIG. 2 is a flowchart of the signal transmission method of embodiment 2 of the disclosure (a second communication node)

As shown in FIG. 2, an embodiment of the disclosure provides a signal transmission method, comprising:
  S210, a second communication node receives data according to a known data transmission manner within a first time length after a control channel, and receives the data by adopting data transmission manner related information notified by a control signaling after the first time length;
  S220, the second communication node determines a number N of data sets comprised in data transmitted by a first communication node to the second communication node in a time unit, and determines a demodulation reference signal resource and a mode that the second communication node receives data according to the N value.

Alternatively, when N is greater than a threshold N1, the mode of receiving data comprises following features that:
  M data set(s) and N–M data set(s) are time division multiplexed in the time unit;
  there is a third time interval between the M data set(s) and the N–M data set(s), and data puncturing is performed on the third time interval, or the first p symbol(s) of the N–M data set(s) is received with a first Cyclic Prefix CP, remaining n-p symbol(s) in the N–M data set(s) is/are received with a second Cyclic Prefix CP, the length of the first Cyclic Prefix CP is greater than the length of the second Cyclic Prefix CP; the N–M data set(s) comprise n symbols, p is less than or equal to n, and n and p are both positive integers.

Alternatively, when N is greater than the threshold N1, the mode of receiving data comprises following features:
  there is an intersection between demodulation reference signal resources of the M data set(s) and demodulation reference signal resources of the control signaling, and demodulation reference signal resources of the control signaling being used as demodulation reference signal resources of the M data set(s);
  the N–M data set(s) share(s) a set of demodulation reference signal resources, or each of the N–M data set(s) carries a demodulation reference signal for demodulating itself, and channel interpolation cannot be performed between a channel estimation value obtained by the demodulation reference signal of the M data set(s) and a channel estimation value obtained by the demodulation reference signal of the N−M data set(s).

Alternatively, when N is greater than the threshold N1, the mode of receiving data comprises following features that:
each data set is independently channel coded; each data set carries a Cyclic Redundancy Check code CRC; each data set corresponds to one piece of ACK/NACK feedback information.

Alternatively, when N is greater than the threshold N1, the mode of receiving data comprises following features:
each data set carries a demodulation reference signal that demodulates itself; each data set is jointly channel coded; all data sets share a Cyclic Redundancy Check code CRC; all data sets correspond to one piece of ACK/NACK feedback information.

Alternatively, when N is greater than the threshold N1, the mode of receiving data comprises following features:
obtaining configuration information of N data set(s) in one control signaling; or
obtaining a time-frequency resource occupied by the N data set(s) in one control signaling;
wherein the configuration information of the data sets comprise: modulation and coding policy MCS information of the data sets, and/or time-frequency resources occupied by the data sets in the time unit.

Alternatively, when N is less than or equal to the threshold value N1, receiving data according to the first receiving structure;
the first receiving structure comprises following features that:
there is a guard interval before the data starts; or
a first a symbol(s) in the data is/are received with the third Cyclic Prefix CP, and remaining t-a symbol(s) is/are received with the fourth Cyclic Prefix CP, and a length of the third Cyclic Prefix CP is greater than a length of the fourth Cyclic Prefix CP; the data comprises t symbol(s), a is less than or equal to t, and both a and t are positive integers.

Alternatively, when N is less than or equal to the threshold value N1, the second communication node determines a mode of receiving data, comprising:
determining, according to the data transmission mode related information notified in the control signaling, whether a notified data transmission manner and a transmission manner known by the second communication node are the same, if it is different, determining to adopt a first receiving structure, if it is the same, determining to adopt a second receiving structure;
wherein the second receiving structure comprises at least one of following features that:
there is no guard interval before the data starts; a start position of the data is the end position of the control channel; all symbols of the data use a Cyclic Prefix CP of the same length.

Alternatively, the second communication node determines the number N of data sets comprised in the data that the first communication node transmits to the second communication node in one time unit, comprising determining N according to at least one of following:
whether a first time interval between a start time of the data and an end time of the control channel is greater than a first time length;
whether a second time interval between an end time of the data and the end time of the control channel is greater than the first time length;
whether the transmission manner of the data to be transmitted in the time unit and the transmission manner known by the second communication node are the same;
the N value being agreed to be less than or equal to the threshold N1.

Alternatively, the second communication node determines the number N of data sets comprised in the data that the first communication node transmits to the second communication node in one time unit, comprising:
when the first time interval is greater than the first time length, determining that N is less than or equal to the threshold N1;
when the first time interval is less than the first time length and the second time interval is less than or equal to the first time length, determining that N is less than or equal to the threshold N1;
when the first time interval is less than the first time length and the second time interval is greater than the first time length, determining that N is greater than the threshold N1.

Alternatively, the second communication node determines the number N of data sets comprised in the data that the first communication node transmits to the second communication node in one time unit, comprising:
when the first time interval is less than the first time length and the second time interval is greater than the first time length, and the transmission manner of the data is the same as the transmission manner of the control channel, determining that N is less than or equal to threshold N1;
when the first time interval is less than the first time length and the second time interval is greater than the first time length, and the transmission manner of the data and the transmission manner of the control channel are different, determining that N is greater than the threshold N1.

Alternatively, when N is less than or equal to the threshold N1, the mode for receiving data comprises following features:
the M data set(s) occupying resources within the first time length after the control channel, and the N−M data set(s) occupying resources after the first time length after the control channel;
wherein the control channel is an entire control domain of a control channel in the time unit, or a control channel where the control signaling is located.

Alternatively, determine the first length of time by one or more of following manners:
according to the receiving manner of the second communication node;
the first time length being a value agreed with the first communication node;
obtaining the first time length by signaling information transmitted by the first communication node;
determining the first time length information according to information fed back to the first communication node by the second communication node.

Alternatively, the data receiving manner known by the second communication node and the receiving manner of the second communication node that receives the control signaling have an agreed relationship;
the data transmitting manner known by the second communication node and the transmitting manner of the first communication node transmitting the control signaling have an agreed relationship.

Alternatively, when N is less than or equal to the threshold value N1, the mode of receiving data comprises following features:
- the data and the control signaling sharing demodulation reference signal resources;
- the data and the control signaling sharing demodulation reference signal resources when there is no guard interval before the data starts;
- when all symbols of the data use a Cyclic Prefix CP of a same length, the data and the control signaling sharing demodulation reference signal resources.

Alternatively, when N is less than or equal to the threshold N1, the mode for receiving data comprises following features:
- a control instruction related to transmitting data comprising an indication domain of whether the data reception is delayed, and the indication domain being used to indicate whether the data indicated by the control signaling is delayed and is not transmitted until a time unit after the time unit of the control signaling.

Alternatively, the threshold N1 is 1; the N value is 1 or 2.

Alternatively, the data transmission manner comprises at least one of following: a transmitting manner that the first communication node transmits the data, and a receiving manner that the second communication node receives the data;
- the data transmission manner satisfying at least one of following characteristics:
- the data transmitting manner known by the second communication node belonging to a collection of data transmitting manners fed back by the second communication node to the first communication node;
- the data receiving manner known by the second communication node belonging to a collection of data receiving manners fed back by the second communication node to the first communication node;
- the data transmitting manner known by the second communication node being determined according to the transmitting manner that the first communication node transmits a control signaling;
- the data receiving manner known by the second communication node being determined according to the receiving manner that the second communication node receives a control signaling;
- the data transmitting manner known by the second communication node being determined according to the transmitting manner that the first communication node recently transmitted data to the second communication node;
- the data receiving manner known by the second communication node being determined according to the transmitting manner that the second communication node recently received data transmitted by the first communication node.

Alternatively, the data transmitting manner known by the second communication node is an optimal transmitting manner of the first communication node that the second communication node feeds back to the first communication node;
- the data receiving manner known by the second communication node is a receiving manner of the second communication node corresponding to the optimal transmitting manner of the first communication node that the second communication node feeds back to the first communication node; or the data receiving manner known by the second communication node is an optimal receiving manner of the second communication node that the second communication node feeds back to the first communication node.

Alternatively, the second communication node obtains the N value and/or the M value by receiving signaling information.

Alternatively, the M value is obtained according to the N value; or the M value is obtained according to the feedback information transmitted by the second communication node; or the M value is a fixed value.

Wherein the transmitting manner comprises at least one of following manners: a transmitting beam, a transmitting port, a transmitting pre-coding matrix, transmitting time, transmitting frequency.

Wherein the transmitting time refers to time occupied by a measurement reference signal in a channel measurement phase or a beam measurement phase; the transmitting frequency domain refers to a frequency domain occupied by a measurement reference signal in the channel measurement phase or the beam measurement phase.

Wherein the data receiving manner is a receiving beam, and/or a receiving port, and/or a receiving pre-coding matrix, and/or a receiving time, and/or a receiving frequency, which are adopted by the terminal receiving data.

Wherein the receiving time refers to time occupied by the measurement reference signal in the channel measurement phase or the beam measurement phase; the transmitting frequency domain refers to the frequency domain occupied by the measurement reference signal in the channel measurement phase or the beam measurement phase.

Wherein the symbol is an OFDM (Orthogonal Frequency Division Multiplexing) symbol.

Wherein one time unit can be one subframe.

The data set may also be referred to as a data block or a data sub-block, and the specific name does not limit the pretransmitted invention.

In one embodiment, the data set has at least one of following characteristics that:
- a) one data set corresponds to one time zone;
- b) the one data set corresponds to one time domain pre-coding resource group;
- c) the one data set corresponds to one relevant area of the data signal;
- d) the one data set corresponds to one quasi-co-location area of the data signal;
- wherein the quasi-co-location area is a time domain resource set, and data signals on different time domain resources in the time domain resource set are quasi-co-located with each other in regard to one or more channel characteristic parameters;
- e) channel characteristic parameters correspond to the same demodulation reference signal in different data sets are different;
- f) transmitting beams correspond to the same demodulation reference signal in different data sets are different;
- g) receiving beams correspond to the same demodulation reference signal in different data sets are different;
- h) the MCS level correspond to each data set may be different;
- i) a demodulation reference signal is carried in the M data set(s);
- j) a demodulation reference signal is carried in the N–M data set(s);
- k) the time domain of the same demodulation reference signal port is divided into two pre-coding resource groups, wherein the first pre-coding resource group comprises the M data set(s), and the second pre-coding resource group comprises the N−M data set(s);

In an embodiment, each of the data sets carries a demodulation reference signal.

In an embodiment, the N value is determined according to a corresponding number of receiving manners in the channel state information that is fed back to the first communication node by the second communication node; and/or the N value is determined according to a corresponding number of transmitting manners in the channel state information that is fed back to the first communication node by the second communication node.

In an embodiment, before receiving the data, radio frequency beam switching time extension information of the second communication node is further fed back to the first communication node by the second communication node.

In an embodiment, there is an association between first information and second information in the control signaling, where the first information comprises a transmitting manner of the signal, and/or a receiving manner of the signal; the second information comprises at least one of following: demodulation reference signal information, time domain pre-coding group information, start position information, modulation and coding strategy MCS set number information, rate matching information.

In an embodiment, the demodulation reference signal resource information of the data is determined according to a relationship between a transmitting manner of the signal notified in the control signaling and a predetermined transmitting manner before the signal; and/or the demodulation reference signal resource information of the data is determined according to a relationship between a receiving manner of the signal notified in the control signaling and a predetermined receiving manner before the signal.

In an embodiment, the guard interval has at least one of following characteristics:
a) the guard interval duration information is carried in the control signaling;
b) the guard interval duration is determined according to the radio frequency beam switching time extension information fed back to the first communication node by the second communication node;
c) the guard interval duration is determined according to the receiving manner number information of the channel quality that the second communication node feeds back to the first communication node;
d) the guard interval duration is determined according to the transmitting manner number information of the channel quality that the second communication node feeds back to the first communication node;
e) the guard interval information is used for rate matching of data;

In an embodiment, the rate matching processing of data is performed according to at least one piece of following information:
a) rate matching information comprised in the control signaling;
b) radio frequency beam switching time extension information fed back to the first communication node by the second communication node;
c) receiving manner number information of the channel quality fed back to the first communication node by the second communication node;
d) transmitting manner number information of the channel quality fed back to the first communication node by the second communication node;
e) transmitting manner information of data notified in the control signaling;
f) receiving manner information of the data notified in the control signaling;
g) relationship information between the transmitting manner of data notified in the control signaling and the predetermined transmitting manner before the data;
h) relationship information between the receiving manner of data notified in the control signaling and the predetermined receiving manner before the data.

Embodiment 3

Figure 3:
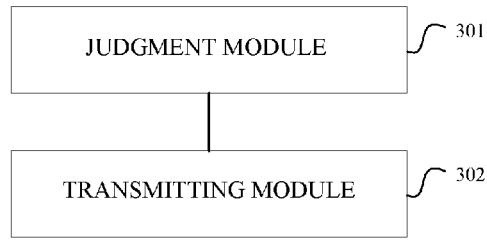
FIG. 3 is a schematic view of a signal transmission device of embodiment 3 of the disclosure (the first communication node)

As shown in FIG. 3, an embodiment of the disclosure provides a signal transmission device, comprising:
a judgment module 301, configured to determine a mode for transmitting data to a second communication node in one time unit;
a transmitting module 302, configured to transmit data to the second communication node in the time unit according to a determined mode for transmitting data;
wherein the data comprises N data set(s), and N is a positive integer; the data transmission manner of the M data set(s) in the data is known by the second communication node, and the data transmission manner related information of the N−M data set(s) is notified to the second communication node by the first communication node in the time unit with a control signaling, M is less than or equal to N.

Alternatively, when N is greater than a threshold N1, the mode for transmitting data comprises following features that:
M data set(s) and N−M data set(s) are time division multiplexed in the time unit;
there is a time interval between the M data set(s) and the N−M data set(s), or the first p symbol(s) of the N−M data set(s) adopt(s) a first Cyclic Prefix CP, and remaining n-p symbol(s) of the N−M data set(s) adopt(s) a second Cyclic Prefix CP, and the length of the first Cyclic Prefix CP is greater than the length of the second Cyclic Prefix CP; the N−M data set(s) comprise n symbols, p is less than or equal to n, both n and p are positive integers.

Alternatively, when N is greater than the threshold N1, the mode for transmitting data comprises following features:
there being intersections between demodulation reference signal resources of the M data set(s) and demodulation reference signal resources of control signalings;
the N−M data set(s) sharing a set of demodulation reference signal resources, or each of the N−M data set(s) carrying a demodulation reference signal that demodulates itself.

Alternatively, when N is greater than the threshold N1, the mode for transmitting data comprises following features:
each data set being independently channel coded; each data set carrying a Cyclic Redundancy Check CRC; each data set corresponding to one piece of ACK/NACK feedback information.

Alternatively, when N is greater than the threshold N1, the mode for transmitting data comprises following features:
each data set carrying a demodulation reference signal that demodulates itself all data sets being jointly channel coded; all data sets sharing a Cyclic Redundancy Check code CRC; all data sets corresponding to one piece of ACK/NACK feedback information.

Alternatively, when N is greater than the threshold N1, the mode for transmitting data comprises following features:

notifying configuration information of N data set(s) simultaneously in one control signaling; or notifying the time-frequency resources occupied by the N data set(s) in a resource scheduling part of one control signaling;

wherein the configuration information of the data sets comprise: a Modulation and Coding Scheme (MCS for short) information of the data sets, and/or time-frequency resources that the data sets occupy in the time unit.

Alternatively, when N is less than or equal to the threshold N1, the mode for transmitting data adopts a first transmitting structure;

the first transmitting structure comprises following features:

there being a guard interval before the data starts; or the length of a third Cyclic Prefix CP adopted by a first a symbol(s) in the data being greater than the length of a fourth Cyclic Prefix CP adopted by remaining t-a symbol(s) in the data;

the data comprising t symbol(s), and a being less than or equal to t, and both a and t being positive integers.

Alternatively, the judgment module 301 is used for a mode that the first communication node transmits data to the second communication node in one time unit when N is less than or equal to the threshold N1, and comprises:

determining whether a transmission manner of the data to be transmitted in the time unit and a transmission manner known by the second communication node are the same, if it is different, determining to adopt the first transmitting structure, and if it is the same, determining to adopt the second transmitting structure;

wherein the second transmitting structure comprises at least one of following features:

there being no guard interval before the data starts; a start position of the data is the end position of a control channel; all symbols of the data use a Cyclic Prefix CP of the same length.

Alternatively, the judgment module 301 is used for determining the number N of data sets according to at least one of following basis:

whether a first time interval between a start time of the data and an end time of the control channel is greater than a first time length;

whether a second time interval between an end time of the data and an end time of the control channel is greater than the first time length;

whether the transmission manner of the data to be transmitted in the time unit and the transmission manner known by the second communication node are the same;

the N value being agreed to be less than or equal to the threshold N1.

Alternatively, the judgment module 301 is configured to determine the number N of data sets by following manners:

when the first time interval is greater than the first time length, determining that N is less than or equal to the threshold N1;

when the first time interval is less than the first time length and the second time interval is less than or equal to the first time length, determining that N is less than or equal to the threshold N1;

when the first time interval is less than the first time length and the second time interval is greater than the first time length, determining that N is greater than the threshold N1.

Alternatively, the judgment module 301 is configured to determine the number N of data sets by following manners:

when the first time interval is less than the first time length and the second time interval is greater than the first time length, and the transmission manner of the data is the same as the transmission manner of the control channel, determining that N is less than or equal to threshold N1;

when the first time interval is less than the first time length and the second time interval is greater than the first time length, and the transmission manner of the data and the transmission manner of the control channel are different, determining that N is greater than the threshold N1.

Alternatively, when N is less than or equal to the threshold N1, the mode for transmitting data comprises following features:

the M data set(s) occupying resources within a first time length after the control channel, and the N−M data set(s) occupying resources after a first time length after the control channel;

wherein the control channel is an entire control domain of a control channel in the time unit, or a control channel where the control signaling is located.

Alternatively, the first time length is determined by the first communication node according to the receiving manner of the second communication node or the information fed back by the second communication node, and is notified to the second communication node by the first communication node;

the first time length is pre-agreed by the first communication node and the second communication node.

Alternatively, the data receiving manner known by the second communication node and the receiving manner of the second communication node that receives the control signaling have an agreed relationship;

the data transmitting manner known by the second communication node and the transmitting manner of the first communication node transmitting the control signaling have an agreed relationship.

Alternatively, when N is less than or equal to the threshold N1, the mode for transmitting data comprises one of following features:

the data and the control signaling sharing demodulation reference signal resources;

the data and the control signaling sharing demodulation reference signal resources when there is no guard interval before the data starts;

when all symbols of the data use a Cyclic Prefix CP of the same length, the data and the control signaling sharing demodulation reference signal resources.

Alternatively, when N is less than or equal to the threshold N1, the mode for transmitting data comprises following features:

a control instruction related to transmitting data comprising an indication domain of whether the data reception is delayed, and the indication domain being used to indicate whether the data indicated by the control signaling is delayed and is not transmitted until a time unit after the time unit of the control signaling.

Alternatively, the threshold N1 is 1; the N value is 1 or 2.

Alternatively, the data transmission manner comprises at least one of following: a transmitting manner that the first communication node transmits the data, and a receiving manner that the second communication node receives the data;

the data transmission manner satisfying at least one of following characteristics:

the data transmitting manner known by the second communication node belonging to a collection of data transmitting manners fed back by the second communication node to the first communication node;

the data receiving manner known by the second communication node belonging to a collection of data receiving manners fed back by the second communication node to the first communication node;

the data transmitting manner known by the second communication node being determined according to the transmitting manner that the first communication node transmits a control signaling;

the data receiving manner known by the second communication node being determined according to the receiving manner that the second communication node receives a control signaling;

the data transmitting manner known by the second communication node being determined according to the transmitting manner that the first communication node recently transmitted a control signaling to the second communication node;

the data receiving manner known by the second communication node being determined according to the transmitting manner that the second communication node recently received a control signaling transmitted by the first communication node.

Alternatively, the data transmitting manner known by the second communication node is an optimal transmitting manner of the first communication node that the second communication node feeds back to the first communication node.

The data receiving manner known by the second communication node is a receiving manner of the second communication node corresponding to the optimal transmitting manner of the first communication node that the second communication node feeds back to the first communication node; or the data receiving manner known by the second communication node is an optimal receiving manner of the second communication node that the second communication node feeds back to the first communication node.

In one embodiment, the data set has at least one of following characteristics:
a) the one data set corresponds to a time zone;
b) the one data set corresponds to a time domain pre-coding resource group;
c) the one data set corresponding to a relevant area of the data signal;
d) the one data set corresponds to one quasi-co-location area of the data signal;
wherein the quasi-co-location area is a time domain resource set, and data signals on different time domain resources in the time domain resource set are quasi-co-located with each other in regard to one or more channel characteristic parameters;
e) channel characteristic parameters corresponding to the same demodulation reference signal in different data sets are different;
f) transmitting beams corresponding to the same demodulation reference signal in different data sets are different;
g) receiving beams corresponding to the same demodulation reference signal in different data sets are different;
h) the MCS level corresponding to each data set may be different;
i) the demodulation reference signals carried in the M data set(s) are different;
j) the demodulation reference signals carried in the N–M data set(s) are different;
k) the time domain of the same demodulation reference signal port is divided into two pre-coding resource groups, wherein the first pre-coding resource group comprises the M data set(s), and the second pre-coding resource group comprises the N–M data set(s);

In an embodiment, each of the data sets carries a demodulation reference signal.

In an embodiment, the N value is determined according to a corresponding number of receiving manners in the channel state information that is fed back to the first communication node by the second communication node; and/or the N value is determined according to a corresponding number of transmitting manners in the channel state information that is fed back to the first communication node by the second communication node.

In an embodiment, the judgment module is configured to receive radio frequency beam switching time extension information fed back by the second communication node before transmitting the data to the second communication node in one time unit.

In an embodiment, there is an association between first information and second information in the control signaling, where the first information comprises a transmitting manner of the signal, and/or a receiving manner of the signal; the second information comprises at least one of following: demodulation reference signal information, time domain pre-coding group information, start position information, modulation and coding strategy MCS set number information, rate matching information.

Wherein the two types of information are associated with each other: the two types of information are jointly encoded, or one type of the information is notified, and the other type of information is obtained according to the one type of information that has been notified;

Wherein the communication node that transmits data and the communication node that transmits a control signaling may be different communication nodes;

Wherein the resource information of the demodulation reference signal comprises at least one of following: port information of the demodulation reference signal, time domain/frequency domain/code domain resource information occupied by the demodulation reference signal, and correlated area information of the demodulation reference signal, QCL area information of the demodulation reference signal.

In an embodiment, the demodulation reference signal resource information of the data is determined according to a relationship between a data transmitting manner notified in the control signaling and a predetermined transmitting manner before the data; and/or the demodulation reference signal resource information of the data is determined according to a relationship between a data receiving manner notified in the control signaling and a predetermined receiving manner before the data.

In an embodiment, the guard interval has at least one of following characteristics:
a) the guard interval duration information is carried in the control signaling;
b) the guard interval duration is determined according to the radio frequency beam switching time extension information fed back to the first communication node by the second communication node;
c) the guard interval duration is determined according to the receiving manner number information of the channel quality that the second communication node feeds back to the first communication node;
d) the guard interval duration is determined according to the transmitting manner number information of the channel quality that the second communication node feeds back to the first communication node;
e) the guard interval information is used for rate matching of data;

Wherein the rate matching of data is the puncturing processing of data;

Wherein the guard interval is an interval between a start position of the data relative to a start position that the first communication node transmits data to the second communication node, which is agreed by the first communication node and the second communication node;

In an embodiment, the rate matching processing of data is performed according to at least one of following information:
a) rate matching information comprised in the control signaling;
b) the radio frequency beam switching time extension information fed back to the first communication node by the second communication node;
c) receiving manner number information of the channel quality fed back to the first communication node by the second communication node;
d) transmitting manner number information of the channel quality fed back to the first communication node by the second communication node;
e) transmitting manner information of data notified in the control signaling;
f) receiving manner information of the data notified in the control signaling;
g) relationship information between the transmitting manner of data notified in the control signaling and the predetermined transmitting manner before the data;
h) relationship information between the receiving manner of data notified in the control signaling and the predetermined receiving manner before the data.

Embodiment 4

Figure 4:
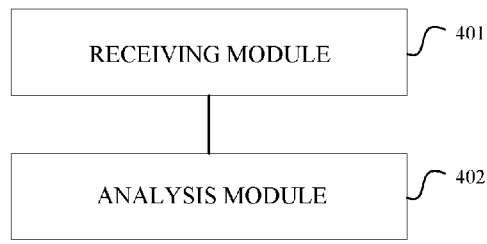
FIG. 4 is a schematic view of the signal transmission device of embodiment 4 of the disclosure (the second communication node)

As shown in FIG. 4, this embodiment provides a signal transmission device, which is applied to a second communication node, and comprises:
a receiving module 401, configured to receive data according to a known data transmission manner within a first time length after a control channel, and to receive data by adopting data transmission manner related information notified by a control signaling after the first time length;
an analysis module 402, configured to determine a number N of data sets comprised in data transmitted by the first communication node to the second communication node in one time unit, and to determine a demodulation reference signal resource and a mode that the second communication node receives data according to the N value.

Alternatively, when N is greater than a threshold N1, the mode of receiving data comprises following features:
M data set(s) and N−M data set(s) are time division multiplexed in the time unit;
there being a third time interval between the M data set(s) and the N−M data set(s), data puncturing is performed on the third time interval, or a first p symbol(s) of the N−M data set(s) being received with a first Cyclic Prefix CP, remaining n−p symbol(s) in the N−M data set(s) being received with a second Cyclic Prefix CP, the length of the first Cyclic Prefix CP is greater than the length of the second Cyclic Prefix CP; the N−M data set(s) comprise(s) n symbols, p is less than or equal to n, and n and p are both positive integers.

Alternatively, when N is greater than the threshold N1, the mode of receiving data comprises following features:
there being an intersection between demodulation reference signal resources of the M data set(s) and demodulation reference signal resources of the control signaling, and demodulation reference signal resources of the control signaling being used as demodulation reference signal resources of the M data set(s);
the N−M data set(s) sharing a set of demodulation reference signal resources, or each of the N−M data set(s) carries a demodulation reference signal for demodulating itself, and channel interpolation cannot be performed between a channel estimation value obtained by the demodulation reference signal of the M data set(s) and a channel estimation value obtained by the demodulation reference signal of the N−M data set(s).

Alternatively, when N is greater than the threshold N1, the mode of receiving data comprises following features:
each data set being independently channel coded; each data set carrying a Cyclic Redundancy Check code CRC; each data set corresponding to one piece of ACK/NACK feedback information.

Alternatively, when N is greater than the threshold N1, the mode of receiving data comprises following features:
each data set carrying a demodulation reference signal that demodulates itself; each data set being jointly channel coded; all data sets sharing a Cyclic Redundancy Check code CRC; all data sets corresponding to one piece of ACK/NACK feedback information.

Alternatively, when N is greater than the threshold N1, the mode of receiving data comprises following features:
Obtaining configuration information of N data set(s) in one control signaling; or
Obtaining a time-frequency resource occupied by the N data set(s) in one control signaling;
The configuration information of the data set comprises: modulation and coding policy MCS information of the data set, and/or time-frequency resources occupied by the data set in the time unit.

Alternatively, the analysis module 402 is configured to receive data according to the first receiving structure when N is less than or equal to the threshold value N1;
the first receiving structure comprises following features:
there being a guard interval before the data starts; or
a first a symbol(s) in the data being received with a third Cyclic Prefix CP, and remaining t-a symbol(s) being received with a fourth Cyclic Prefix CP, and a length of the third Cyclic Prefix CP being greater than a length of the fourth Cyclic Prefix CP; the data comprising t symbol(s), a being less than or equal to t, and a and t being both positive integers.

Alternatively, when N is less than or equal to the threshold N1, the analysis module 402 is configured to determine a mode that the second communication node receives data by following ways:
determining, according to the data transmission mode related information notified in the control signaling, whether the notified data transmission manner and the transmission manner known by the second communication node are the same, if it is different, determining to adopt a first receiving structure, if it is the same, determining to adopt a second receiving structure;

wherein the second receiving structure comprises at least one of following features:
there being no guard interval before the data starts; a start position of the data is the end position of the control channel; all symbols of the data use a Cyclic Prefix CP of the same length.

Alternatively, the analysis module 402 is configured to determine the number N of data sets comprised in the data that the first communication node transmits to the second communication node in one time unit by following ways:
determining N according to at least one of following:
whether a first time interval between a start time of the data and an end time of the control channel is greater than a first time length;
whether a second time interval between an end time of the data and the end time of the control channel is greater than the first time length;
whether the transmission manner of the data to be transmitted in the time unit and the transmission manner known by the second communication node are the same;
the N value being agreed to be less than or equal to the threshold N1.

Alternatively, the analysis module 402 is configured to determine the number N of data sets comprised in the data that the first communication node transmits to the second communication node in one time unit by following ways:
when the first time interval is greater than the first time length, determining that N is less than or equal to the threshold N1;
when the first time interval is less than the first time length and the second time interval is less than or equal to the first time length, determining that N is less than or equal to the threshold N1;
when the first time interval is less than the first time length and the second time interval is greater than the first time length, determining that N is greater than the threshold N1.

Alternatively, the analysis module 402 is configured to determine the number N of data sets comprised in the data that the first communication node transmits to the second communication node in one time unit by following ways:
when the first time interval is less than the first time length and the second time interval is greater than the first time length, and the transmission manner of the data is the same as the transmission manner of the control channel, determining that N is less than or equal to threshold N1;
when the first time interval is less than the first time length and the second time interval is greater than the first time length, and the transmission manner of the data and the transmission manner of the control channel are different, determining that N is greater than the threshold N1.

Alternatively, when N is less than or equal to the threshold N1, the mode for receiving data comprises following features:
the M data set(s) occupying resources within the first time length after the control channel, and the N−M data set(s) occupying resources after the first time length after the control channel;
wherein the control channel is an entire control domain of a control channel in the time unit, or a control channel where the control signaling is located.

Alternatively, the first time length is determined by one or more of following ways:
according to the receiving manner of the second communication node;
the first time length being a value agreed with the first communication node;
obtaining the first time length by signaling information transmitted by the first communication node;
determining the first time length information according to information fed back to the first communication node by the second communication node.

Alternatively, the data receiving manner known by the second communication node and the receiving manner of the second communication node that receives the control signaling have an agreed relationship;
the data transmitting manner known by the second communication node and the transmitting manner of the first communication node transmitting the control signaling have an agreed relationship.

Alternatively, when N is less than or equal to the threshold value N1, the mode of receiving data comprises following features:
the data and the control signaling sharing demodulation reference signal resources;
the data and the control signaling sharing demodulation reference signal resources when there is no guard interval before the data starts;
when all symbols of the data use a Cyclic Prefix CP of the same length, the data and the control signaling sharing demodulation reference signal resources.

Alternatively, when N is less than or equal to the threshold N1, the mode for receiving data comprises following features:
a control instruction related to transmitting data comprising an indication domain of whether the data reception is delayed, and the indication domain being used to indicate whether the data indicated by the control signaling is delayed and is not transmitted until a time unit after the time unit of the control signaling.

Alternatively, the threshold N1 is 1; the N value is 1 or 2.

Alternatively, the data transmission manner comprises at least one of following: a transmitting manner that the first communication node transmits the data, and a receiving manner that the second communication node receives the data;
the data transmission manner satisfying at least one of following characteristics:
the data transmitting manner known by the second communication node belonging to a collection of data transmitting manners fed back by the second communication node to the first communication node;
the data receiving manner known by the second communication node belonging to a collection of data receiving manners fed back by the second communication node to the first communication node;
the data transmitting manner known by the second communication node being determined according to the transmitting manner that the first communication node transmits a control signaling;
the data receiving manner known by the second communication node being determined according to the receiving manner that the second communication node receives a control signaling;
the data transmitting manner known by the second communication node being determined according to the transmitting manner that the first communication node recently transmitted a control signaling to the second communication node;
the data receiving manner known by the second communication node being determined according to the receiving manner that the second communication node recently received a control signaling transmitted by the first communication node.

Alternatively, the data transmitting manner known by the second communication node is an optimal transmitting manner of the first communication node that the second communication node feeds back to the first communication node;

the data receiving manner known by the second communication node is a receiving manner of the second communication node corresponding to the optimal transmitting manner of the first communication node that the second communication node feeds back to the first communication node; or the data receiving manner known by the second communication node is an optimal receiving manner of the second communication node that the second communication node feeds back to the first communication node.

In one embodiment, the data set has at least one of following characteristics:
a) the one data set corresponds to a time zone;
b) the one data set corresponds to a time domain pre-coding resource group;
c) the one data set corresponding to a relevant area of the data signal;
d) the one data set corresponds to one quasi-co-location area of the data signal;
wherein the quasi-co-location area is a time domain resource set, and data signals on different time domain resources in the time domain resource set are quasi-co-located with each other in regard to one or more channel characteristic parameters;
e) channel characteristic parameters corresponding to the same demodulation reference signal in different data sets are different;
f) transmitting beams corresponding to the same demodulation reference signal in different data sets are different;
g) receiving beams corresponding to the same demodulation reference signal in different data sets are different;
h) the MCS level corresponding to each data set may be different;
i) the demodulation reference signals carried in the M data set(s) are different;
j) the demodulation reference signals carried in the N–M data set(s) are different;
k) the time domain of the same demodulation reference signal port is divided into two pre-coding resource groups, wherein the first pre-coding resource group comprises the M data set(s), and the second pre-coding resource group comprises the N–M data set(s);

In an embodiment, each of the data sets carries a demodulation reference signal.

In an embodiment, the N value is determined according to a corresponding number of receiving manners in the channel state information that is fed back to the first communication node by the second communication node; and/or the N value is determined according to a corresponding number of transmitting manners in the channel state information that is fed back to the first communication node by the second communication node.

In an embodiment, the device further comprises: an information sending module 403, configured to feed radio frequency beam switching time extension information of the second communication node back to the first communication node before receiving the data.

In an embodiment, there is an association between first information and second information in the control signaling, where the first information comprises a transmitting manner of the signal, and/or a receiving manner of the signal; the second information comprises at least one of following: demodulation reference signal information, time domain pre-coding group information, start position information, modulation and coding strategy MCS set number information, rate matching information.

In an embodiment, the device further comprises: an information determining module 405, configured to determine demodulation reference signal resource information of the data according to the control signaling;

in an embodiment, the information determining module is configured to determine, according to the control signaling, demodulation reference signal resource information of the data by following manners: the demodulation reference signal resource information of the data is determined according to a relationship between a transmitting manner of the signal notified in the control signaling and a predetermined transmitting manner before the signal; and/or the demodulation reference signal resource information of the data is determined according to a relationship between a receiving manner of the signal notified in the control signaling and a predetermined receiving manner before the signal.

In an embodiment, the guard interval has at least one of following characteristics:
a) the guard interval duration information is carried in the control signaling;
b) the guard interval duration is determined according to the radio frequency beam switching time extension information fed back to the first communication node by the second communication node;
c) the guard interval duration is determined according to the receiving manner number information of the channel quality that the second communication node feeds back to the first communication node;
d) the guard interval duration is determined according to the transmitting manner number information of the channel quality that the second communication node feeds back to the first communication node;
e) the guard interval information is used for rate matching of data;

In an embodiment, the rate matching processing of data is performed according to at least one of following information:
a) rate matching information comprised in the control signaling;
b) the radio frequency beam switching time extension information fed back to the first communication node by the second communication node;
c) receiving manner number information of the channel quality fed back to the first communication node by the second communication node;
d) transmitting manner number information of the channel quality fed back to the first communication node by the second communication node;
e) transmitting manner information of data notified in the control signaling;
f) receiving manner information of the data notified in the control signaling;
g) relationship information between the transmitting manner of data notified in the control signaling and the predetermined transmitting manner before the data;
h) relationship information between the receiving manner of data notified in the control signaling and the predetermined receiving manner before the data.

Embodiment 5

In the embodiment, a base station (i.e., the first communication node mentioned above) transmits data and a demodulation reference signal to a terminal (i.e., the second communication node mentioned above);

the base station transmits data to the terminal by following steps.

step 10: determine a number N of data sets comprised in the data;

step 11: determine a transmitting structure of the data and a transmitting manner of the demodulation reference signal according to the N value.

The terminal receives data by following steps:

step 20: receive a downlink control domain, and detect a downlink control channel;

step 21: receive data after a first time unit length after the downlink control channel is received by adopting a predetermined receiving manner;

step 22: if a control information related to the downlink data transmitted by the base station to the terminal is detected, the receiving mode is determined according to the receiving mode related information indicated in the control information, and the data transmitted by the base station is received after the first time length by using the determined receiving mode;

step 23: determining the number N of data sets comprised in the data;

step 24: determine the transmitting structure of the data and the transmitting manner of the demodulation reference signal according to the N value, thereby receiving the data and the demodulation reference signal by adopting a suitable receiving algorithm.

There is no order between the steps 2223, which may be performed in parallel.

Figure 5A:
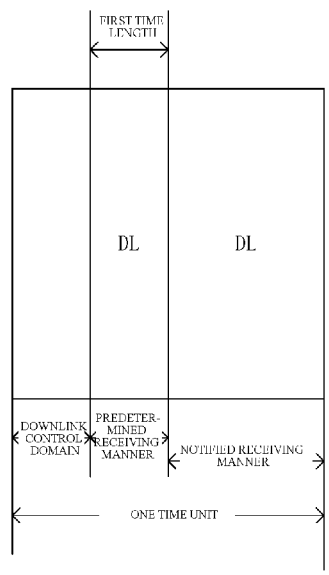
FIG. 5a is a first schematic diagram of a receiving manner of a terminal in a time unit in embodiment 5 of the disclosure.
Figure 5B:
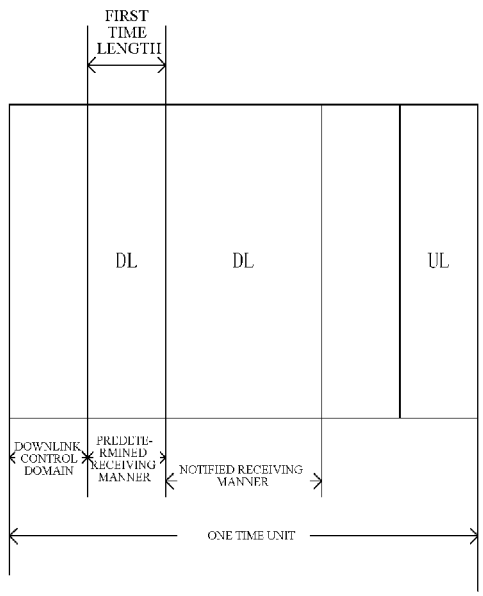
FIG. 5b is a second schematic diagram of the receiving manner of the terminal in a time unit in embodiment 5 of the disclosure.
Figure 5C:
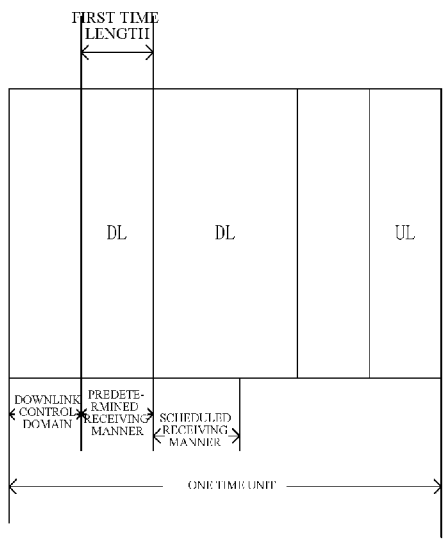
FIG. 5c is a third schematic diagram of the receiving manner of the terminal in a time unit in embodiment 5 of the disclosure.

As shown in FIG. 5a to FIG. 5b, the terminal detects a control channel in the downlink control domain, and receives a signal transmitted by the base station in a predetermined receiving manner within a first time length after a control region of one time unit. After the time length, the terminal detects the control information transmitted by the base station. If the base station transmits data to the terminal in the time unit, the terminal further receives the data information in the notified receiving manner after the first time length according to the receiving manner notified in the control information. Then, the number N of data sets comprised in the data is determined, and the transmitting structure of the data and the transmitting structure of the demodulation reference signal are determined according to the N value, and the terminal further receives the data by adopting a suitable receiving algorithm. A structure comprised in one time unit in FIG. 5a to FIG. 5b is only exemplary and does not limit the present disclosure. In FIG. 5a to FIG. 5b, the terminal receives the data in whole downlink time domain after the first time length, and the embodiment does not exclude the terminal from receiving the data in a part of the downlink time domain after the first time length, as shown in FIG. 5c. The notified receiving manner may be the same as or different from the predetermined receiving manner.

In the embodiment, the predetermined receiving manner is that the base station and the terminal are agreed before a current time unit. A first implementation is: agreeing that the receiving manner is a receiving manner corresponding to the optimal transmitting manner fed back by the terminal; a second implementation is: the receiving manner is that the base station notifies to the terminal by a control signaling before a current time unit; a third implementation is: the receiving manner is determined according to a receiving manner of the control channel, preferably, the receiving manner is the same as the receiving manner of the control channel. Wherein the control channel may be an entire control domain of the time unit, or may be a control channel corresponding to the data-related control signaling.

In this embodiment, the receiving manner related information of the data is notified in the control signaling, and the base station notifies the receiving manner of the data, and may adopt any one of following manners: directly notifying the receiving manner of the data, and notifying the transmitting manner of the data (the terminal can obtain the data receiving manner according to the transmitting manner of the notification based on the corresponding relationship between the transmitting manner and the receiving manner obtained in the previous channel measurement phase or the beam measurement phase). At this moment, the receiving manner related information of the data cannot be applicable to data sets within the first time length, such as not applicable to M data set(s).

When the N value is greater than 1, the receiving manner of the M data set(s) is predetermined, and the receiving manner related information of remaining N−M data set(s) is notified to the second communication node by a control signaling in the time unit, M is a natural number less than N.

When the number N of the data sets is greater than one, the M data set(s) and the N−M data set(s) are time division multiplexed, and the M data set(s) and the N−M data set(s) have a third time interval as a guard interval, no signal is transmitted to the terminal in the third time interval (it is possible to transmit data to the other terminals), or first one or more symbols in the N−M data set(s) each uses a long CP, remaining symbols of the N−M data set(s) each uses a short CP, wherein the length of the long CP is greater than the length of the short CP. Preferably said one symbol refers to an OFDM symbol.

Figure 5D:
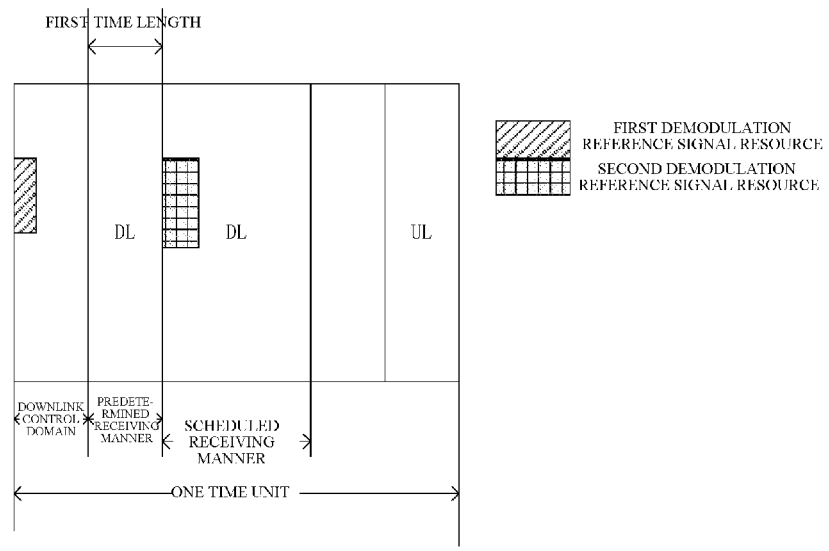
FIG. 5d is a first schematic diagram of demodulation reference signal resources in embodiment 5 of the disclosure.

At this moment, a first implementation of demodulation reference signal is: the M data set(s) and the control signaling share a set of demodulation reference signal resources, and the N−M data set(s) share(s) a set of demodulation reference signal resources, or each of the N−M data set(s) carries a demodulation reference signal that demodulates itself. As shown in FIG. 5d, N=2, M=1, wherein a first data set (i.e., the M data set(s)) is within a first time length shown in the figure, and the first data set and the control signaling share a first demodulation reference signal resource, the N−M data set(s) (i.e., a second data set) being located after a first time length, which uses a second demodulation reference signal resource.

Figure 5E:
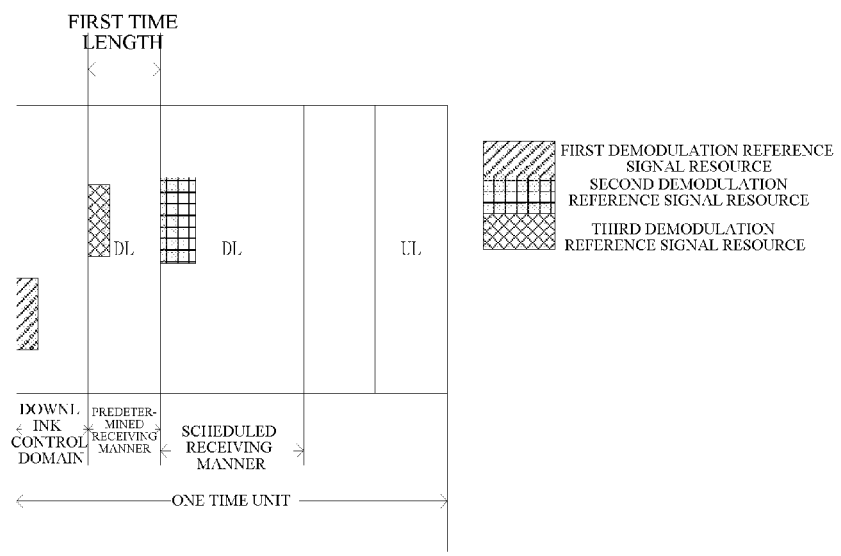
FIG. 5e is a second schematic diagram of the demodulation reference signal resources in embodiment 5 of the disclosure.

A second implementation of demodulation reference signal at this time is: each data set carries a demodulation reference signal that demodulates its data set. As shown in FIG. 5e, wherein the M data set(s) is/are within a first time length shown in the figures, and a demodulation reference signal thereof is a third demodulation reference signal resource, and the N−M data set(s) is/are located after the first time length, a demodulation reference signal thereof is a second demodulation reference signal resource. The control signaling uses a first demodulation reference signal resource. In FIGS. 5d and 5e, the resources occupied by the demodulation reference signal resources are only examples and do not exclude other pattern modes.

At this time, in the first embodiment with respect to the channel coding and modulation, it satisfies at least one of following features: each data set being independent channel coded; each data set carrying a CRC (Cyclic Redundancy Check code); the data set corresponding to one piece of ACK/NACK feedback information, wherein the one piece of ACK/NACK feedback information may further have different feedback bits for different codewords, or may have one feedback bit for all codewords; the M data set(s) MCS and MCS adopted by the control channel having an agreed relationship; the MCS of M data set(s) and MCS of a portion of codewords of the N−M data set(s) having agreed relationship; MCS level of the M data set(s) being lower than MCS level of the N−M data set(s), wherein the higher the MCS level, the higher the channel coding rate, and/or the higher the modulation order; the codewords of the M data set(s) being a subset of the code words of the N−M data set(s), for example, the data of the M data set(s) and the partial data of the N−M data set(s) together form one codeword, for example, they correspond to different redundancy versions after the same source channel coding, and can be independently decoded, or they together form one redundancy versions after one source channel coding, only correspond to a different segment of one redundancy version, and need to be jointly decoded. Preferably, a segment corresponding to the first data set adopts a low-level modulation mode, and a segment corresponding to the second data set adopts an advanced modulation mode; the number of codewords of the M data set(s) is less than or equal to the number of codewords of the N−M data set(s); the transmission information of the N data set(s) is simultaneously notified in one control signaling; the receiving manner of the data notified in one control signaling is not applicable to the M data set(s); the time-frequency resources occupied by the N data set(s) are notified in one control signaling, and preferably the time-frequency resources use only one field to comprise all time-frequency units of the N data set(s); and each data set is time division multiplexed. Preferably, the M data set(s) is/are located in a resource of a predetermined first time length after the control channel, and the N−M resources are located in a resource after the predetermined first time length of the control channel. Preferably, M is 1, the M data set(s) is/are a first data set, N=2, and the N−M data set(s) correspond(s) to a second data set.

At this time, in a second implementation of channel coding and modulation, it satisfies at least one of following features: all data sets being jointly coded, all data sets sharing one CRC, and all data sets corresponding to one piece of ACK/NACK feedback information.

In this embodiment, both the transmitting manner of the data and the receiving manner of the data refers to a spatial domain transmitting manner and a spatial domain receiving mode of the data. The transmitting manner comprises at least one of following manners: a transmitting beam, a transmitting port, a transmitting pre-coding matrix, transmitting time, transmitting frequency. Wherein the transmitting time refers to time occupied by a measurement reference signal of a channel measurement phase or a beam measurement phase. Similarly, the transmitting frequency domain refers to a frequency domain occupied by a measurement reference signal of a channel measurement phase or a beam measurement phase. The receiving manner of the data is a receiving beam, and/or a receiving port, and/or a receiving pre-coding matrix, and/or a receiving time, and/or a receiving frequency employed by the terminal to receive data. Wherein the receiving time refers to time occupied by a measurement reference signal of a channel measurement phase or a beam measurement phase. Similarly, the transmitting frequency domain refers to a frequency domain occupied by a measurement reference signal of a channel measurement phase or a beam measurement phase. Wherein the transmitting manner is a transmitting manner of the base station in a communication link transmitted by the base station and received by the terminal, and the receiving manner is a receiving manner of the terminal in the communication link transmitted by the base station and received by the terminal.

In the embodiment, the one time unit may be one sub-frame.

In the embodiment, the data set may also be referred to as a data block, or a data sub-block, or one data set may correspond to a time zone, and the specific name does not limit the present disclosure. Specifically, as shown in FIG. 5a to FIG. 5e, a part of the scheduling data of the terminal that falls within a time zone received in a predetermined receiving manner constitutes the first data set (i.e., the M data set(s), M=1), and the data that the scheduling data of the terminal falling within the time zone received in accordance with a notified receiving manner constitutes the second data set (i.e., the N−M data set(s), N=2). In the above figure, when the predetermined receiving manner and the notified receiving manner are the same, the N value may be 1, that is, the scheduled data constitutes a data set at this time, that is, N=1 at this time.

Embodiment 6

This embodiment is similar to the process of the embodiment 5, and mainly describes a method in which the base station determines the number N of transmitting data sets in the step 10 and the number N of data sets determined by the terminal in the step 23 in the embodiment 5. In this embodiment, the base station or the terminal determines the number N of data sets according to at least one of following information: a first time interval between a start time of the data and an end time of the control channel, a second time interval between an end time of the data and an end time of the control channel, a predetermined first time length after the control channel; whether the receiving manner of the data is the same as the predetermined receiving manner of the second communication node; whether the transmitting manner of the data is the same as the predetermined transmitting manner of the first communication node. Wherein the receiving manner of the data is obtained according to receiving manner related information notified in the control signaling. If the receiving manner of the data is different from the predetermined receiving manner of the terminal, the receiving manner notified in the control signaling is not applicable to data in a resource within a predetermined first time length after the control channel, for example, the receiving mode is not applicable to M data set(s).

The control channel refers to a control channel region in the one time unit, or refers to a control region in which a dynamic control signaling corresponding to the data is located.

Figure 6A:
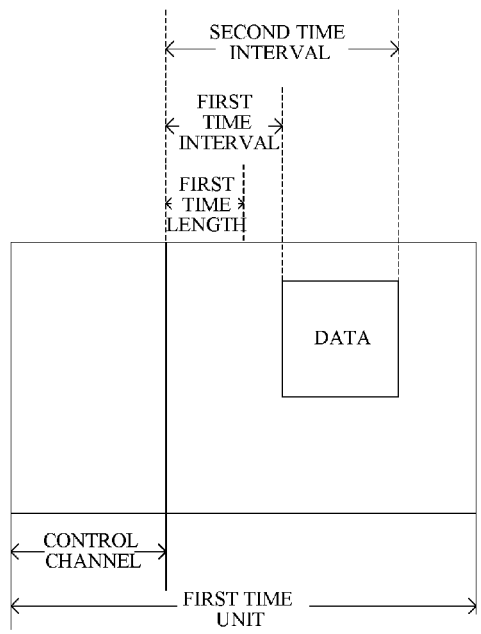
FIG. 6a is a first schematic diagram of determining the number of data set comprised in data in embodiment 6 of the disclosure.
Figure 6B:
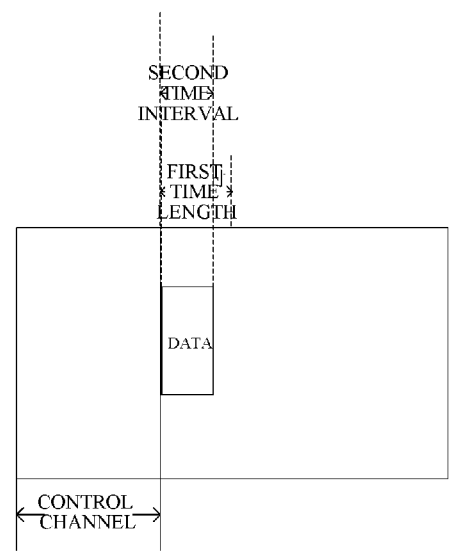
FIG. 6b is a second schematic diagram of determining the number of data set comprised in data in embodiment 6 of the disclosure.
Figure 6C:
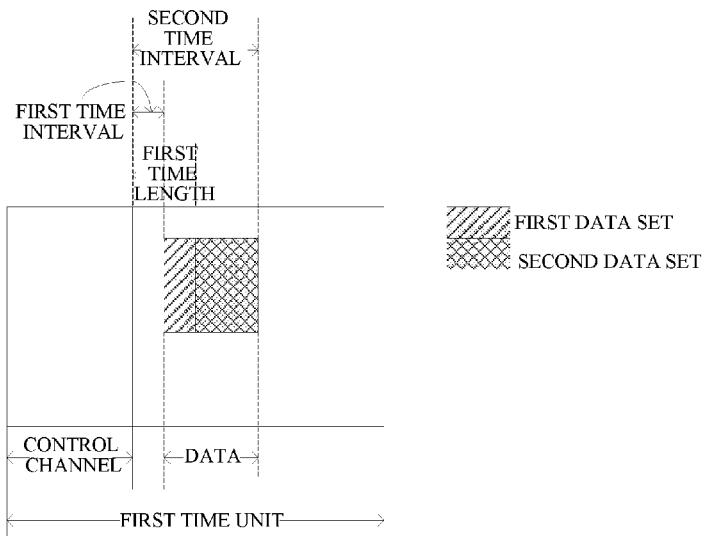
FIG. 6c is a third schematic diagram of determining the number of data set comprised in data in embodiment 6 of the disclosure.

In a first implementation of the present embodiment, as shown in FIG. 6a, when the first time interval is greater than or equal to a first time length, the N value is 1. When the first time interval is less than the first time length and the second time interval is less than or equal to the first time length, the N value is 1. As shown in FIG. 6b, in FIG. 6b, a start position of the data is overlapped with an end position of the control channel, a length of the first time interval is 0 at this time. When the first time interval is less than the first time length and the second time interval is greater than the first time length, the N value is 2, wherein the first data set occupies resources within the first time length after the control channel, and the second data set occupies resources after the first time length after the control channel, wherein the receiving manner of the first data set is predetermined, and the receiving manner of the second data set is dynamically indicated by the control signaling, as shown in FIG. 6c. In FIGS. 6a to 6c, the resources in the first time unit are scheduled by the control channel in the first time unit, wherein the control channel and data are both transmitted by the base station to the terminal (or a transmitting node of control is different from a transmitting node of data). The data in FIGS. 6a to 6c only occupies a part of the bandwidth, and then the data of different terminals is scheduled by frequency division/time division/space division, and this embodiment does not exclude that the data occupies all system bandwidth, and the data of different terminals is scheduled by time division/space division. The start position and the end position of the data in FIGS. 6a to 6c are only examples, and other positional situations are not excluded, for example, the start position of the data being fixed as the end position of the control channel, and/or the end position of the data being fixed to a position, such as the end position of the first time unit. As shown in FIGS. 6a to 6b, when scheduled resources of the terminal constitute one data set (i.e., N=1), the time domain resources scheduled by the terminal constitute one time zone; As shown in FIG. 6c, when scheduled resources of the terminal constitute two data sets (i.e., N=2), the time domain resources scheduled by the terminal constitute two time zones. Specifically, a part of scheduled data of the terminal that falls within a time zone received in the predetermined receiving manner forms the first data set (i.e., the M data set(s), M=1), data of scheduled data of the terminal that falls within a time zone received in the notified receiving manner forms the second data set (i.e., the N−M data set(s), N=2).

In a second implementation manner of the present embodiment, when the first time interval is less than the first time length and the second time interval is greater than the first time length, further determines the N value according to whether the receiving manner of the data and the predetermined receiving manner of the first communication node are the same. Specifically, when the receiving manner of the data is the same as the predetermined receiving manner of the second communication node, the N value is 1. When the receiving manner of the data is different from the predetermined receiving manner of the second communication node, the N value is 2. Wherein the first data set occupies resources within a first time length after the control channel, and the second data set occupies resources after the first time length after the control channel. The receiving manner of the first data set is predetermined, and the receiving manner of the second data set is dynamically indicated by the control signaling. Specifically, as shown in FIGS. 6a to 6b, the N value is also 1. For FIG. 6c, when the predetermined receiving manner and the notified receiving manner are different, and/or when the predetermined transmitting manner and the notified transmitting manner are different, then the N value is 2, and the value of N is 1 when the predetermined receiving manner and the notified receiving manner are the same. That is, at this time, the first data set and the second data set are merged into one data set, or the predetermined receiving manner and the notified receiving manner are the same, and the predetermined transmitting manner and the notified transmitting manner are the same, and the N value is 1, that is, the first data set and the second data set are merged into one data set at this time.

Figure 7A:
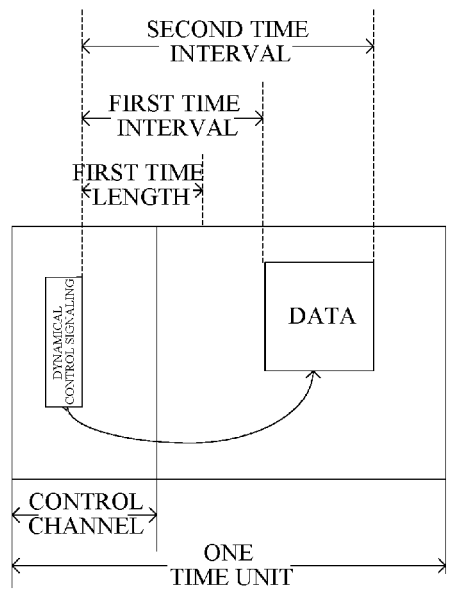
FIG. 7a is a fourth schematic diagram of determining the number of data set comprised in data in embodiment 6 of the disclosure.
Figure 7B:
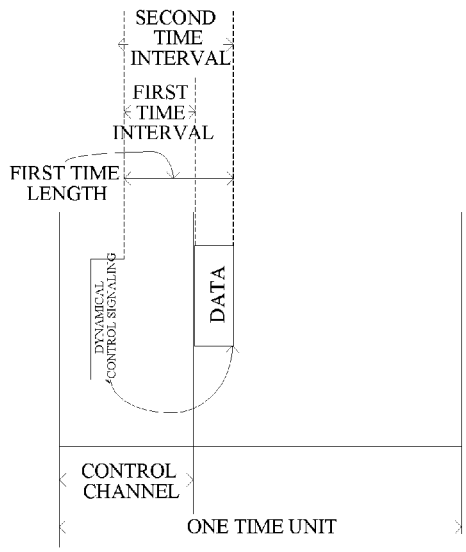
FIG. 7b is a fifth schematic diagram of determining the number of data set comprised in data in embodiment 6 of the disclosure.
Figure 7C:
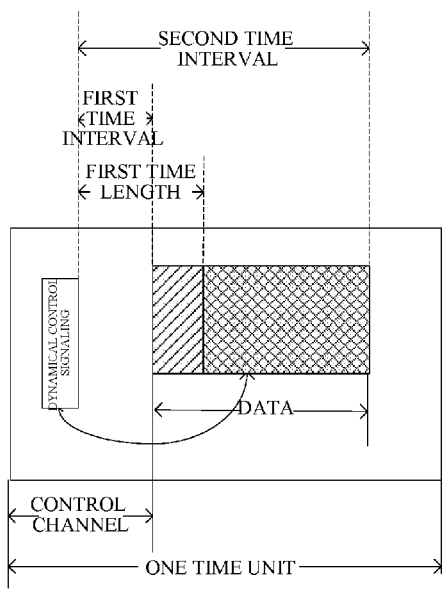
FIG. 7c is a sixth schematic diagram of determining the number of data set comprised in data in embodiment 6 of the disclosure.

The end position of the control channel when calculating the first time interval and the second time interval may be the end position of the entire control channel in the one time unit, or the control channel time division in the one time unit is multiple control channels. At this time, calculating the first time interval and the second time interval as well as the end position of the control channel at the first time length are the end position of the control channel where the dynamic control signaling corresponding to the data is located, as shown in FIG. 7a to FIG. 7c, which is similar to the first implementation, except that the control channel is not the entire control channel of the first time unit (wherein the number of time domain symbols occupied by the entire control channel may be determined by, for example, information notified by similar Physical Control Format Indicator Channel (PCFICH for short) in Long Term Evolution (LTE for short)), but the control region that the dynamic control signaling corresponding to the data in a control domain is located. In FIGS. 7a to 7c, the data only occupies a part of the bandwidth. At this time, the data of different terminals is scheduled by frequency division/time division/space division. The present embodiment does not preclude that the data occupies all of the system bandwidth, and the data of different terminals is scheduled by time division/space division. The start position and the end position of the data in FIGS. 7a to 7c are only examples, and other positional situations are not excluded, for example, the start position of the data being fixed as the end position of the control channel, and/or the end position of the data is fixed to one position, such as the end position of the first time unit.

In FIGS. 6c and 7c, the frequency domains of the first data set and the second data set overlap, the embodiment does not exclude that the frequency domain occupied by the first data set and the second data set do not overlap.

In the above embodiment, only the time-frequency resources occupied by the data portion in the figures are notified in the dynamic signaling resource scheduling field. The terminal obtains a first time interval between the start position of the data and the end position of the control channel and a second time interval between the end position of the data and the end position of the control channel according to the time-frequency resource occupied by the data portion, and then determine the number of data sets according to the above implementation.

Figure 8A:
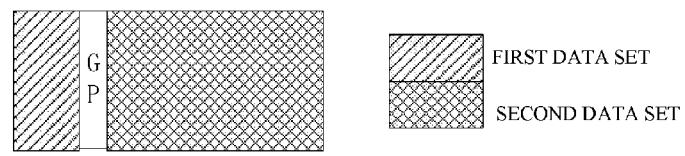
FIG. 8a is a schematic diagram showing a guard interval between two data sets in embodiment 6 of the disclosure.
Figure 8B:
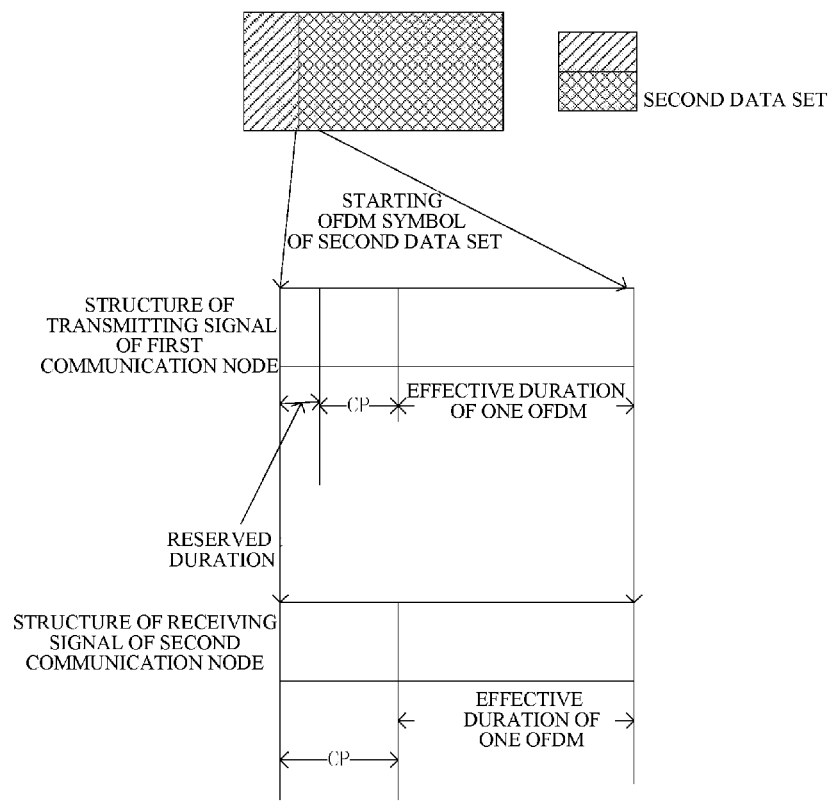
FIG. 8b is a schematic diagram showing that a start symbol of the second data set using a long CP in embodiment 6 of the disclosure.

In FIGS. 6c and 7c, when the data is divided into a first data set and a second data set and is transmitted, the end position of the first data set is the start position of the second data set. For structure of two data sets, in the second implementation of this embodiment, as shown in FIG. 8a, there is a guard interval between the first data set and the second data set for the terminal to switch a receiving beam. Wherein a duration of the guard interval is agreed by the base station and the terminal, or the guard interval is used for a transmitting end to switch the transmit beam. In a third implementation of the present embodiment of two data sets structure, the terminal receives data by a long CP in a CP length of one or more OFDM at the start of the second data set, while the other OFDM symbols of the second data set may receive data by a short CP (of course, it is not excluded that there is a long CP in other OFDM, for example, a long CP agreed in each slot), wherein a length of the long CP is greater than a predetermined threshold, a length of the short CP is less than or equal to a predetermined threshold. At this time, the first OFDM of the second time unit is received by a long CP. At this time, the base station may not use a long CP when transmitting the OFDM symbol, but use a short CP, and reserve a certain duration and a puncture on the reserved duration is not transmitted to the terminal. As shown in FIG. 8b, the transmitting end transmits a start OFDM symbol of the second data set by a short CP, and before CP of OFDM from an end of the first data set to a start of the second set of data starts, the base station does not transmit a signal to the terminal in a reserved duration. Since the reserved duration is relatively short, at this time, in order to achieve simplicity at the terminal, the long CP is used to receive the initial OFDM symbol. Certainly, at this time, the terminal may also receive the initial OFDM symbol by using the same structure as the base station symbol transmitting structure, that is, the terminal also considers that there is a reserved duration before the initial OFDM symbol at this time. Since the reserved duration is reserved in the time domain, then it is recommended that data of different terminals is scheduled by time division multiplexing, or different terminals implement switching of the first data set and the second data at the same location.

Preferably, in the embodiment, when it is judged that the N value is 1, the data and the control signaling share a set of demodulation reference signal resources.

In this embodiment, the base station determines the first time length by one or more of following manners, according to the receiving manner of the terminal (i.e., the second communication node mentioned above), for example, the terminal is an omnidirectional receiving manner, the first time length is 0 at this time; the first time length is a value agreed with the terminal; the first time length is notified to the terminal by signaling information; the first time length information is determined according to information fed back by the terminal, for example, radio frequency beam switching delay of the terminal is different, alternatively, the information fed back by the terminal is a switching delay that the terminal switches a radio frequency beam; the first time length is different, or according to CSI information fed by the terminal, when the transmitting beam comprised in the feedback CSI information only corresponds one receive beam, the first time length is 0 at this time, and when the receiving beam corresponding to all of transmitting beams in the CSI information is greater than 1, the first time length is greater than 0. That is, at this time, the first time length and the receiving beam related information of CSI fed back in the terminal measurement phase are jointly encoded and fed back to the base station, and the terminal and the base station agree on the relationship between the receiving beam and the first time length.

With reference to the embodiment 5, in this embodiment, the base station transmits a control signaling to the terminal, where the first information and the second information are associated with each other. Wherein the first information comprises transmitting manner information, and/or receiving manner information; and the second information comprises at least one of following: demodulation reference signal information, time domain pre-coding group information, start position information, modulation and coding strategy MCS set number information, and rate matching information.

The association between the first information and the second information in the control signaling refers to that: the control signaling comprises information that is jointly encoded by the first information and the second information, or the control signaling comprises one of the first information and the second information, and one information is notified by the other information comprised in the control signaling. For example, a parameter value of the second information can be obtained by the first information.

Embodiment 7

In this embodiment, a number of fixed data sets is N, such as a data set without time division multiplexing in one subframe, but the data adopts a first transmitting structure, and the first transmitting structure satisfies one of following features: there is a first guard interval before the data starts, alternatively, the base station may notify the first guard interval time or agrees with the terminal on the first guard interval time length. Wherein one method that the base station notifies the first guard interval length is that the base station notifies the start position of the data, or directly notifies the first guard interval length, at this time, the first guard interval is a distance from a start position of the terminal notified by the base station to the terminal to the start of scheduling data transmitted by the base station to the terminal, and no signal is transmitted to the first communication node at the first guard internal; a first OFDM at the start of the data uses a long CP, and the other OFDM corresponding to the data adopts a short CP, wherein the length of the long CP is greater than the length of the short CP.

At this time, before the control channel is detected, the terminal does not receive data, and the terminal receives the data by a receiving manner of control signaling notification after the control channel is detected.

Embodiment 8

In this embodiment, a number of fixed data sets is N, such as a data set without time division multiplexing in one subframe. The terminal receives data in a predetermined receiving manner within a first predetermined time length after the control channel, and if its own control information is detected in the control channel, receives the data according to receiving manner related information notified in the control information. Then according whether a transmitting manner of the data is the same as the predetermined transmitting manner of the first communication node, and whether a receiving manner of the data is the same as the predetermined receiving manner of the second communication node, determine a transmitting structure and a receiving structure of the data.

Figure 9A:
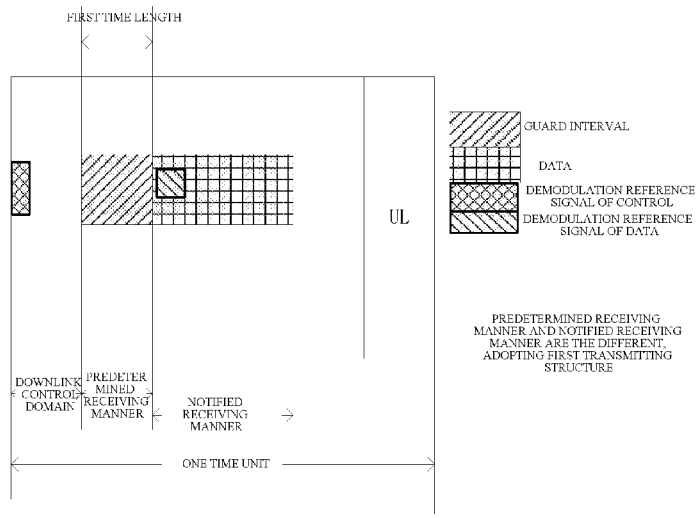
FIG. 9a is a schematic diagram of a first transmitting structure and a demodulation reference signal in embodiment 8 of the disclosure.

Specifically, when the transmitting manner of the data is different from the predetermined transmitting manner of the first communication node, and/or the receiving manner of the data is different from the predetermined receiving manner of the second communication node, the data adopts a first transmitting structure, as shown in FIG. 9a. Wherein the first transmitting structure satisfies one of following features: there is a first guard interval before the data starts, no signal is transmitted to the first communication node in the first guard interval; a first OFDM at the start of the data uses a long CP, the other OFDM corresponding to the data adopts a short CP, wherein the length of the long CP is greater than the length of the short CP.

If there is the first guard interval, the terminal punctures the received data at the first guard interval.

Figure 9B:
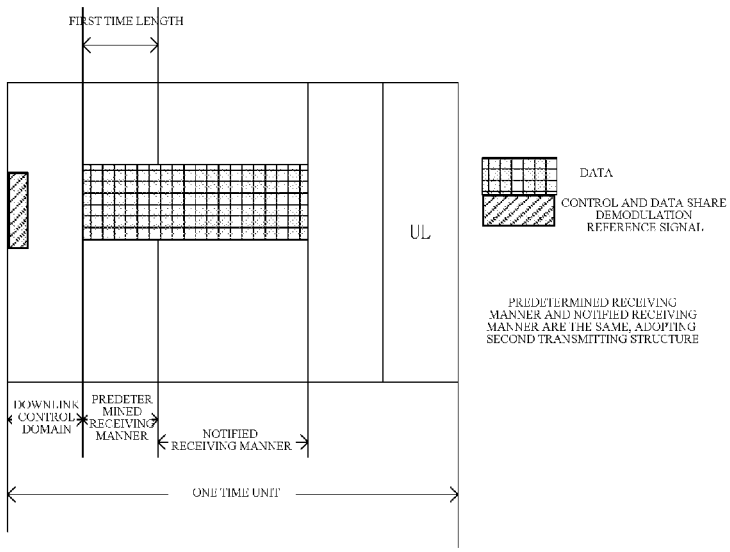
FIG. 9b is a schematic diagram of a second transmitting structure and the demodulation reference signal in embodiment 8 of the disclosure.

When the transmitting manner of the data is the same as the predetermined transmitting manner of the first communication node, and/or the receiving manner of the data is the same as the predetermined receiving manner of the second communication node, a second transmitting structure is adopted, wherein the second transmitting structure satisfies at least one of following features: there is not the first guard interval before the data starts, and a start position of the data is an end position of control channel; all OFDM symbols of the data corresponds to the same CP length, as shown in FIG. 9b.

Preferably, for demodulation reference signals, when the first transmitting structure is adopted, the data and the control signaling have respective demodulation reference signals, as shown in FIG. 9*a*. When the second transmitting structure is adopted, preferably the data and the control signaling share demodulation reference signal resources, as shown in FIG. 9*b*. In FIGS. 9*a* and 9*b*, patterns of the demodulation reference signals are merely examples, and do not exclude other pattern forms. In summary, receiving manner related information and demodulation reference signal related information in signaling information are jointly encoded. The terminal determines whether the data is the first transmitting structure or the second transmitting structure according to the relationship between the receiving manner in the signaling and the predetermined receiving manner of the terminal, and further determines the transmitting condition of resources of the demodulation reference signals, and the demodulation reference signal resources are received by a transmitting condition of a determined demodulation reference signal. At this time, a preferred receiving manner predetermined by the terminal mentioned above is the same as a receiving manner of a terminal receiving control signaling. Or transmitting manner related information and the demodulation reference signal related information in the signaling information are jointly encoded.

In this embodiment, receiving manner related information of the data is notified in the control signaling, and the base station may directly notify the receiving manner of the data, or notify the transmitting manner of the data (the terminal obtains a correspondence between the transmitting manner and the receiving manner according to a previous channel measurement phase or a previous beam measurement phase, thereby obtaining the receiving manner of the data according to the transmitting manner of the notification), and the receiving manner related information the data cannot be applied to a data set within a first time length, for example, cannot be applied to M data set(s).

The second implementation of this embodiment is to judge the transmitting structure of the data, and/or demodulate the transmitting structure of the reference signal according whether the receiving manner of the control signaling and the predetermined receiving manner of the terminal are the same, and whether the transmitting manner of the control signaling and the predetermined transmitting manner of the terminal are the same.

Specifically, when the receiving manner of the control signaling is different from the predetermined receiving manner of the terminal, and/or the transmitting manner of the control signaling is different from the predetermined transmitting manner of the terminal, the first transmitting structure is adopted to transmit data and receive data. When the receiving manner of the control signaling is the same as the predetermined receiving manner of the terminal, and the transmitting manner of the control signaling is the same as the predetermined transmitting manner of the terminal, the second transmitting structure is adopted to transmit data and receive data. Preferably, when the second transmitting structure is adopted, the control signaling and the data share the demodulation reference signal, and when the first transmitting structure is adopted, the control signaling and the data have respective demodulation reference signals.

Embodiment 9

In this embodiment, the terminal receives a control signaling of a current time unit, where the control signaling has an indication domain in which data related transmission information and whether data reception is delayed, and the indication domain indicates whether the data indicated by the control signaling is delayed to be transmitted in a time unit after a time unit in which the control signaling is located.

When an indication that the data reception need to be delayed is obtained in the indication domain, according to an agreed rule, the data is received in a time unit after the time unit in which the control signaling is located, or the data is received in the time unit indicated in the indication domain, when the data is obtained. When an indication that the data reception need not to be delayed is obtained in the indication domain, the data is received in a current time unit in which the control signaling is located.

Embodiment 10

Figure 10:
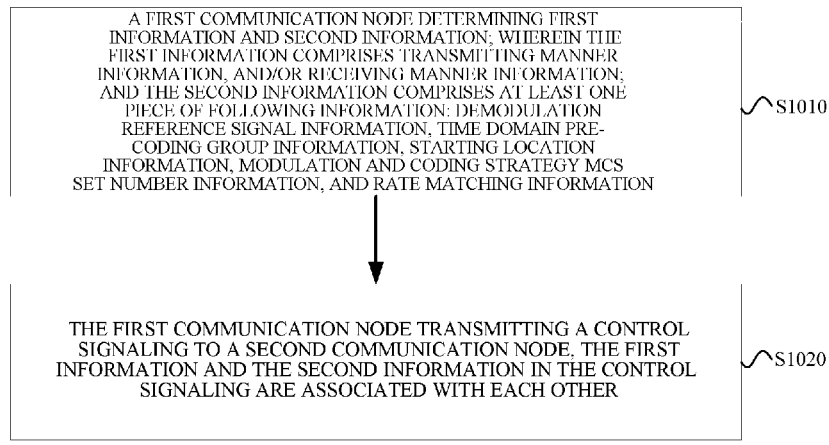
FIG. 10 is a flowchart of a transmission method for control signaling of embodiment 10 of the disclosure (the first communication node)

As shown in FIG. 10, an embodiment of the present disclosure provides a method for transmitting a control signaling, comprising:

S1010, a first communication node determining first information and second information; wherein the first information comprises transmitting manner information, and/or receiving manner information; and the second information comprises at least one piece of following information: demodulation reference signal information, time domain pre-coding group information, starting location information, modulation and coding strategy MCS set number information, and rate matching information;

S1020, the first communication node transmitting a control signaling to a second communication node, the first information and the second information in the control signaling are associated with each other;

wherein the method may also comprise following features:

wherein in an implementation, the association between the first information and the second information in the control signaling means that: the control signaling contains information that is jointly encoded by the first information and the second information, or the control signaling contains one of the first information and the second information, and notify one piece of information by using another piece of information comprised in the control signaling;

wherein, the rate matching information indicates that the data needs to be punctured on some time domain and/or frequency domain resources.

In an implementation, determining the second information comprises:
  determining the second information according to whether a transmitting manner notified in the control signaling transmitted to the second communication node and a predetermined transmitting manner before the second communication node are the same; and/or
  determining the second information according to whether a receiving manner notified in the control signaling transmitted to the second communication node and a predetermined receiving manner before the second communication node are the same.

In an implementation, notifying one piece of information by another piece of information comprised in the control signaling comprises:
  the first information being combined with a third information to notify the second information, wherein the third information comprises at least one of following information:

whether a first time interval between a start time of the signal and an end time of the control channel is greater than a first time length;

whether a second time interval between an end time of the signal and an end time of the control channel is greater than the first time length;

whether the transmission manner of the signal transmitted in a current time unit and the transmission manner known by the second communication node are the same;

wherein the signal comprises a data channel signal, and/or a control channel signal;

wherein in an implementation, the first time length is determined by one or more of following ways:

the first time length being determined according to a receiving manner of the second communication node;

the first time length being a value agreed by the second communication node and the first communication node;

the first time length being obtained by signaling information transmitted by the first communication node;

the first time length being determined according to information fed back to the first communication node by the second communication node.

Embodiment 11

Figure 11:
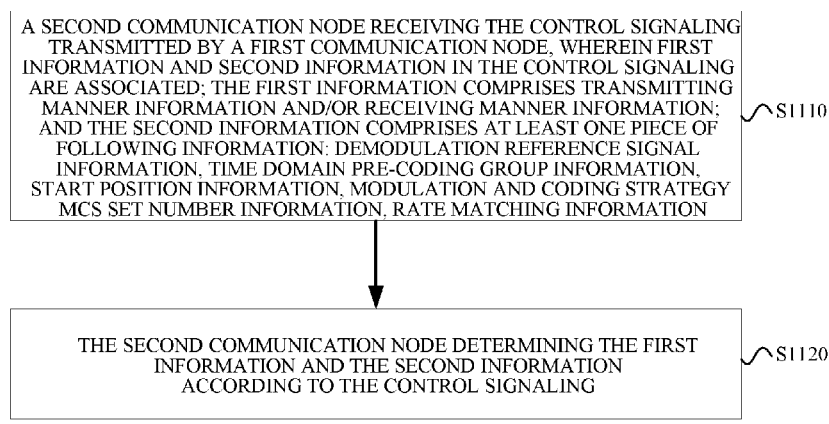
FIG. 11 is a flowchart of a transmission method for control signaling of embodiment 11 of the disclosure (the second communication node)

As shown in FIG. 11, an embodiment of the present disclosure provides a method for transmitting a control signaling, comprising:

S1110, a second communication node receiving the control signaling transmitted by a first communication node, wherein first information and second information in the control signaling are associated; the first information comprises transmitting manner information and/or receiving manner information; and the second information comprises at least one piece of following information: demodulation reference signal information, time domain pre-coding group information, start position information, modulation and coding strategy MCS set number information, rate matching information;

S1120, the second communication node determining the first information and the second information according to the control signaling;

wherein the method may also comprise following features:

wherein, in an embodiment, the association between the first information and the second information in the control signaling means that: the control signaling contains information that is jointly encoded by the first information and the second information, or the control signaling contains one of the first information and the second information, and notify one piece of information by using another piece of information comprised in the control signaling;

wherein, the rate matching information indicates that the data needs to be punctured on some time domain and/or frequency domain resources.

In an implementation, determining the second information comprises:

determining the second information according to whether a transmitting manner of notified in the control signaling and a predetermined transmitting manner before the second communication node are the same; and/or determining the second information according to whether a receiving manner notified in the control signaling and a predetermined receiving manner before the second communication node are the same.

In an implementation, notifying one piece of information by another piece of information comprised in the control signaling comprises:

the first information being combined with a third information to notify the second information, wherein the third information comprises at least one of following information:

whether a first time interval between a start time of the signal and an end time of the control channel is greater than a first time length;

whether a second time interval between an end time of the signal and an end time of the control channel is greater than the first time length;

whether the transmission manner of the signal transmitted in a current time unit and the transmission manner known by the second communication node are the same;

wherein the signal comprises a data channel signal, and/or a control channel signal;

wherein in an implementation, the first time length is determined by one or more of following:

the first time length being determined according to a receiving manner of the second communication node;

the first time length being a value agreed by the second communication node and the first communication node;

the first time length being obtained by signaling information transmitted by the first communication node;

the first time length being determined according to information fed back to the first communication node by the second communication node.

Embodiment 12

Figure 12:
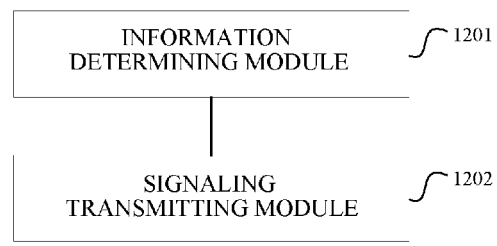
FIG. 12 is a schematic diagram of a transmission device for control signaling of embodiment 12 of the disclosure (the first communication node)

As shown in FIG. 12, an embodiment of the disclosure provides a controlling signaling transmission device, used in the first communication node, comprising:

an information determining module 1201, configured to determine first information and second information; wherein, the first information comprises transmitting manner information, and/or receiving manner information; and the second information comprises at least one piece of following information: demodulation reference signal information, time domain pre-coding group information, starting location information, modulation and coding strategy MCS set number information, and rate matching information;

a signaling transmitting module 1202, configured to transmit a control signaling to a second communication node, the first information and the second information in the control signaling are associated with each other;

wherein the device may also comprise following features:

wherein, in an implementation, the association between the first information and the second information in the control signaling means that: the control signaling contains information that is jointly encoded by the first information and the second information, or the control signaling contains one of the first information and the second information, and notify one piece of information by using another piece of information comprised in the control signaling;

wherein, the rate matching information indicates that the data needs to be punctured on some time domain and/or frequency domain resources.

In an implementation, the information determining module is configured to determine the second information in following manner:
  determining the second information according to whether a transmitting manner notified in the control signaling transmitted to the second communication node and a predetermined transmitting manner before the second communication node are the same; and/or
  determining the second information according to whether a receiving manner notified in the control signaling transmitted to the second communication node and a predetermined receiving manner before the second communication node are the same.

In an implementation, notifying one piece of information by another piece of information comprised in the control signaling comprises:
  the first information being combined with a third information to notify the second information, wherein the third information comprises at least one of following information:
  whether a first time interval between a start time of the signal and an end time of the control channel is greater than a first time length;
  whether a second time interval between an end time of the signal and the end time of the control channel is greater than the first time length;
  whether the transmission manner of the signal transmitted in a current time unit and the transmission manner known by the second communication node are the same;
  wherein the signal comprises a data channel signal, and/or a control channel signal;
  wherein in an implementation, the first time length is determined by one or more of following:
  the first time length being determined according to a receiving manner of the second communication node;
  the first time length being a value agreed by the second communication node and the first communication node;
  the first time length being obtained by signaling information transmitted by the first communication node;
  the first time length being determined according to information fed back to the first communication node by the second communication node.

Embodiment 13

Figure 13:
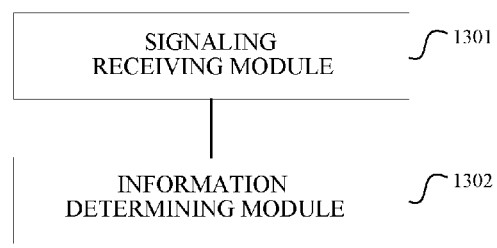
FIG. 13 is a schematic diagram of a transmission device for control signaling of embodiment 13 of the disclosure (the second communication node).

As shown in FIG. 13, an embodiment of the disclosure provides a controlling signaling transmission device, used in the second communication node, comprising:
  a signaling receiving module 1301, configured to receive a control signaling transmitted by the first communication node; wherein first information and second information in the control signaling are associated; the first information comprises transmitting manner information and/or receiving manner information; and the second information comprises at least one piece of following information: demodulation reference signal information, time domain pre-coding group information, start position information, modulation and coding strategy MCS set number information, rate matching information;
  an information determining module 1302, configured to determine the first information and second information according to the control signaling;
  wherein the device may also comprise following features:
  wherein, in an embodiment, the association between the first information and the second information in the control signaling means that: the control signaling contains information that is jointly encoded by the first information and the second information, or the control signaling contains one of the first information and the second information, and notify one piece of information by using another piece of information comprised in the control signaling;
  wherein, the rate matching information indicates that the data needs to be punctured on some time domain and/or frequency domain resources.

In an implementation, the information determining module is configured to determine the second information according to the control signaling in following manner:
  determining the second information according to whether a transmitting manner of notified in the control signaling and a predetermined transmitting manner before the second communication node are the same; and/or
  determining the second information according to whether a receiving manner notified in the control signaling and a predetermined receiving manner before the second communication node are the same.

In an implementation, notifying one piece of information by another piece of information comprised in the control signaling comprises:
  the first information being combined with a third information to notify the second information, wherein the third information comprises at least one of following information:
  whether a first time interval between a start time of the signal and an end time of the control channel is greater than a first time length;
  whether a second time interval between an end time of the signal and the end time of the control channel is greater than the first time length;
  whether the transmission manner of the signal transmitted in a current time unit and the transmission manner known by the second communication node are the same;
  wherein the signal comprises a data channel signal, and/or a control channel signal;
  wherein in an implementation, the first time length is determined by one or more of following:
  the first time length being determined according to a receiving manner of the second communication node;
  the first time length being a value agreed by the second communication node and the first communication node;
  the first time length being obtained by signaling information transmitted by the first communication node;
  the first time length being determined according to information fed back to the first communication node by the second communication node.

INDUSTRIAL APPLICABILITY

According to the technical solutions provided by the embodiments of the present disclosure, the first communication node (for example, the base station) determines a mode for transmitting data to the second communication node (for example, the terminal) in one time unit, and transmits data to the second communication node in the time unit according to the determined mode for transmitting data; and the data comprises N data set(s), wherein a data transmission manner of the M data set(s) in the data is known by the second communication node, and the data transmission manner related information of N−M data set(s) is/are notified to the second communication node by the first communication node in the time unit by a control signaling. The second communication node receives data according to a known data transmission manner within a first time length after the control channel, and receives data after the first time length by using data transmission manner related information notified by the control signaling; and the second communication node determines a number N of data sets comprised in the data transmitted by the first communication node to the second communication node in one time unit, and determining demodulation reference signal resource and a mode that the second communication node receives the data according to the N value. The technical solutions of the embodiments of the present disclosure can solve the problem of data reception, the problem of transmitting and receiving the demodulation reference signal, and the related problems of channel coding and modulation between different data units, when the terminal has multiple radio frequency receiving beams in the high frequency communication, so that the base station is able to flexibly schedule resources based on system efficiency.

What is claimed is:

1. A wireless communication method, comprising:
   receiving, by a terminal, data from a base station,
      wherein the data is received within a time length,
      wherein the time length is after a control channel,
      wherein a part of the data is received within the time length according to a predetermined receiving manner,
      wherein another part of the data is received after the time length by using a data transmission manner related information notified by a control signaling,
      wherein the time length is based on information fed back by the terminal to the base station, and
      wherein the control signaling comprises start position information of the data.

2. A wireless communication device, comprising a processor configured to:
   receive, by a terminal, data from a base station,
      wherein the data is received within a time length,
      wherein the time length is after a control channel,
      wherein a part of the data is received within the time length according to a predetermined receiving manner,
      wherein another part of the data is received after the time length by using a data transmission manner related information notified by a control signaling,
      wherein the time length is based on information fed back by the terminal to the base station, and
      wherein the control signaling comprises start position information of the data.

3. The method according to claim 1, further comprising:
   determining, by the terminal, a number N of data sets included in the data received from the base station in a time unit according to a corresponding number of receiving manners or a corresponding number of transmitting manners in channel state information that is fed back by the terminal to the base station.

4. The wireless communication device according to claim 2, wherein the processor is further configured to:
   determine, by the terminal, a number N of data sets included in the data received from the base station in a time unit according to a corresponding number of receiving manners or a corresponding number of transmitting manners in channel state information that is fed back by the terminal to the base station.

5. A non-transitory computer readable program storage medium having code stored thereon, the code, when executed by a processor, causing the processor to implement a method, comprising:
   receiving, by a terminal, data from a base station,
      wherein the data is received within a time length,
      wherein the time length is after a control channel,
      wherein a part of the data is received within the time length according to a predetermined receiving manner,
      wherein another part of the data is received after the time length by using a data transmission manner related information notified by a control signaling,
      wherein the time length is based on information fed back by the terminal to the base station, and
      wherein the control signaling comprises start position information of the data.

6. The non-transitory computer readable program storage medium according to claim 5, wherein the method further comprises:
   determining, by the terminal, a number N of data sets included in the data received from the base station in a time unit according to a corresponding number of receiving manners or a corresponding number of transmitting manners in channel state information that is fed back by the terminal to the base station.

* * * * *